(12) United States Patent
Nakamura

(10) Patent No.: US 11,643,585 B2
(45) Date of Patent: May 9, 2023

(54) LATENT HEAT STORAGE BODY

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 161 days.

(21) Appl. No.: 16/970,358

(22) PCT Filed: Dec. 10, 2018

(86) PCT No.: PCT/JP2018/045343
§ 371 (c)(1),
(2) Date: Aug. 15, 2020

(87) PCT Pub. No.: WO2019/159514
PCT Pub. Date: Aug. 22, 2019

(65) Prior Publication Data
US 2021/0087447 A1 Mar. 25, 2021

(30) Foreign Application Priority Data
Feb. 16, 2018 (JP) .............................. JP2018-025784

(51) Int. Cl.
C09K 5/06 (2006.01)
F28D 20/02 (2006.01)
F28D 20/00 (2006.01)

(52) U.S. Cl.
CPC .............. C09K 5/063 (2013.01); F28D 20/02 (2013.01); F28D 2020/0008 (2013.01)

(58) Field of Classification Search
CPC . C09K 5/063; F28D 20/02; F28D 2020/0008; F28D 20/021
(Continued)

(56) References Cited

U.S. PATENT DOCUMENTS

| | | | | |
|---|---|---|---|---|
| 4,585,572 A * | 4/1986 | Lane | ...................... | C09K 5/063 126/714 |
| 4,673,520 A * | 6/1987 | Hawe | ...................... | C09K 5/063 165/104.11 |
| 8,919,424 B2 * | 12/2014 | Yoshida | ................... | H01L 24/40 165/80.4 |

FOREIGN PATENT DOCUMENTS

| CN | 102268241 A | 12/2011 |
|---|---|---|
| JP | 58-180579 A | 10/1983 |

(Continued)

OTHER PUBLICATIONS

Chinese Office Action for the related Chinese Patent Application No. 201880089429.9 dated Mar. 30, 2022.
(Continued)

Primary Examiner — Tho V Duong
Assistant Examiner — Raheena R Malik
(74) Attorney, Agent, or Firm — Kenealy Vaidya LLP

(57) ABSTRACT

This latent heat storage body is provided with: a latent heat storage material; and a temperature-sensitive material exhibiting different functions at a temperature equal to or higher than a specific temperature and at a temperature lower than the specific temperature, in which a phase change temperature is changed by using the function of the temperature-sensitive material according to ambient temperature. This latent heat storage body is characterized in that: the phase change temperature is set, by the function of the temperature-sensitive material when the ambient temperature is lower than the specific temperature, to one among a low temperature setting and a high temperature setting having a higher temperature than the low temperature setting; and the phase change temperature is set to the other setting among the low temperature setting and the high temperature setting by the function of the temperature-sensitive material when
(Continued)

the ambient temperature is equal to or higher than the specific temperature.

1 Claim, 9 Drawing Sheets

(58) Field of Classification Search
USPC .......................................................... 165/10
See application file for complete search history.

(56) References Cited

FOREIGN PATENT DOCUMENTS

| JP | 61-150842 U | 9/1986 | | |
|---|---|---|---|---|
| JP | 62-45849 A | 2/1987 | | |
| JP | 2006-183970 A | 7/2006 | | |
| JP | 2006-232940 A | 9/2006 | | |
| JP | 2006232940 A | * 9/2006 | ............. | F24S 60/10 |
| JP | 2007-131608 A | 5/2007 | | |
| JP | 2011-174656 A | 9/2011 | | |
| JP | 2016-142514 A | 8/2016 | | |

OTHER PUBLICATIONS

"The Biomedical Hydrogel (First Edition)" [M]; Xue Wei et al.; Jinan University Press; pp. 111-113; the publication date is Dec. 31, 2012.

"Research Progress of Modern Material Science and Technology (First Edition)" [M]; Zhou Jing; Wuhan University of Technology Press; p. 316; the publication date is Dec. 31, 2012.

"QuEChERS Technology and Application (First Edition)" [M]; Bian Zhaoyang et al.; China Light Industry Press; p. 229; the publication date is Nov. 30, 2017.

* cited by examiner

OTHER END SIDE ⟵⎯⎯⎯⎯⟶ ONE END SIDE

OTHER END SIDE ⟵⎯⎯⎯⎯⟶ ONE END SIDE

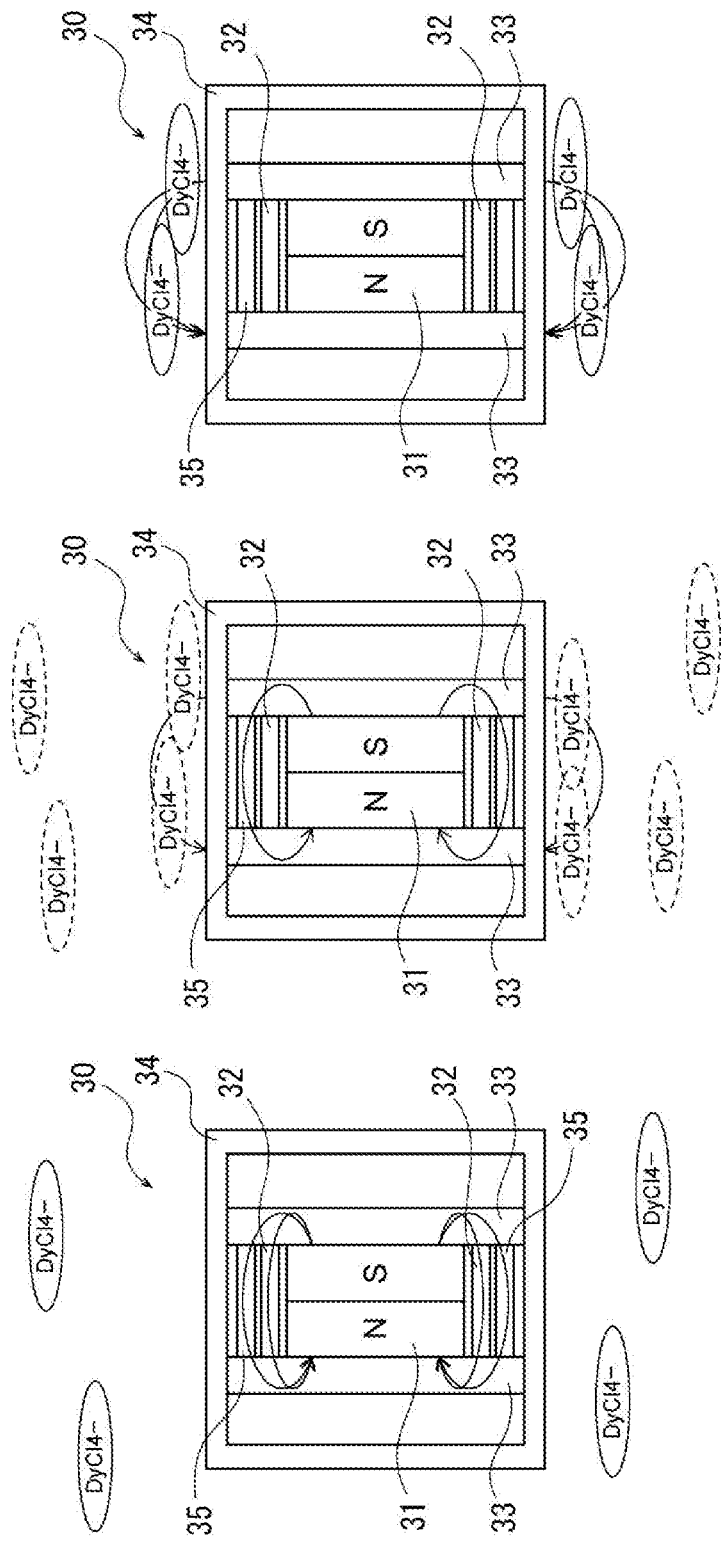

LATENT HEAT STORAGE BODY

TECHNICAL FIELD

The present invention relates to a latent heat storage body capable of self-adjusting a phase change temperature.

BACKGROUND ART

In a related art, many technologies have been proposed for providing a latent heat storage material in an attic of a building, a floor material, a wall material, and indoor furnishings and providing indoor air temperature adjustments. In a mid-latitude region, cooling is required in the summer and heating is required in the winter. A target temperature level for the temperature adjustment for the indoor space is nearly constant in both heating and cooling, which is about 18° C. to 26° C., or more desirably, about 20° C. to 24° C. in order to adjust the indoor air to such a temperature range by heat radiation and heat absorption of the heat storage material, a certain temperature difference between the indoor air and the heat storage material is required, and an ideal heat storage temperature to be used for cooling is lower than 20° C. to 24° C., and an ideal heat storage temperature to be used for heating is higher than 20° C. to 24° C.

However, when a latent heat storage material having a phase change temperature with such a temperature range is used, there is a problem that the effect rapidly deteriorates as the temperature of the indoor air to be air-conditioned approaches close to a comfort zone. Therefore, proposed is a cooling and heating device that includes a latent heat storage material having a phase change temperature of about 26° C. or higher for the purpose of heating, and a latent heat storage material having a phase change temperature of about 18° C. or lower for the purpose of cooling, and that uses the latent heat storage materials described above for the air-conditioning according to the season (see Patent Literature 1, for instance).

CITATION LIST

Patent Literature

Patent Literature 1: JP-A-2011-174656

SUMMARY OF INVENTION

Technical Problem

However, in the cooling and heating device described in Patent Literature 1, since the latent heat storage material for low temperature use and the latent heat storage material for high temperature use are provided, the total weight and volume are considerably increased.

The present invention has been made to solve the problems described above, and accordingly, an object is to provide a latent heat storage body that is not required to include a latent heat storage material for low temperature use and a latent heat storage material for high temperature use and that is capable of self-adjusting a phase change temperature.

Solution to Problem

The latent heat storage body according to the present invention includes a latent heat storage material and a temperature-sensitive material. The temperature-sensitive material exhibits different functions at a temperature equal to or higher than a specific temperature and at a temperature lower than the specific temperature. This latent heat storage body changes the phase change temperature by using the function of the temperature-sensitive material according to ambient temperature.

Advantageous Effects of Invention

According to the present invention, since there is provided a temperature-sensitive material that exhibits different functions at a temperature equal to or higher than a specific temperature and at a temperature lower than the specific temperature, it is not required to provide a latent heat storage material for low temperature use and a latent heat storage material for high temperature use to change the phase change temperature using the function of the temperature-sensitive material according to ambient temperature, and it is possible to self-adjust the phase change temperature.

BRIEF DESCRIPTION OF DRAWINGS

FIGS. 10A and 103 are state diagrams illustrating a function of the latent heat storage body according to the tenth embodiment, in which FIG. 10A illustrates a state at a temperature lower than a Curie temperature, and FIG. 1.0B illustrates a state at a temperature equal to or higher than a Curie temperature.

FIGS. 12A to 12C are state diagrams illustrating the function of the latent heat storage body according to the tenth embodiment, in which FIG. 12A illustrates a state at a temperature lower than the Curie temperature, FIG. 12B illustrates a state at a temperature equal to or higher than the Curie temperature and lower than a second Curie temperature, and FIG. 12C illustrates a state at a temperature equal to or higher than the second Curie temperature.

FIGS. 13A and 13B are configuration diagrams illustrating a latent heat storage body according to a twelfth embodiment, in which FIG. 13A is an overall configuration diagram and FIG. 13B is a partial configuration diagram.

FIGS. 14A and 14B are state diagrams illustrating the function of the latent heat storage body according to the twelfth embodiment, in which FIG. 14A illustrates a state at a temperature lower than a specific temperature, and FIG. 14B illustrates a state at a temperature equal to or higher than the specific temperature.

DESCRIPTION OF EMBODIMENTS

Hereinafter, the present invention will be described according to preferred embodiments. It should be noted that the present invention is not limited to the embodiments described below, and can be modified as appropriate without departing from the gist of the present invention. Moreover, in the embodiment illustrated below, there are places where illustration and explanation of a part of the configuration are omitted, but it is needless to say that publicly known or well-known techniques are appropriately applied to the details of the omitted techniques as long as no contradiction occurs with the contents described below.

Figure 1:
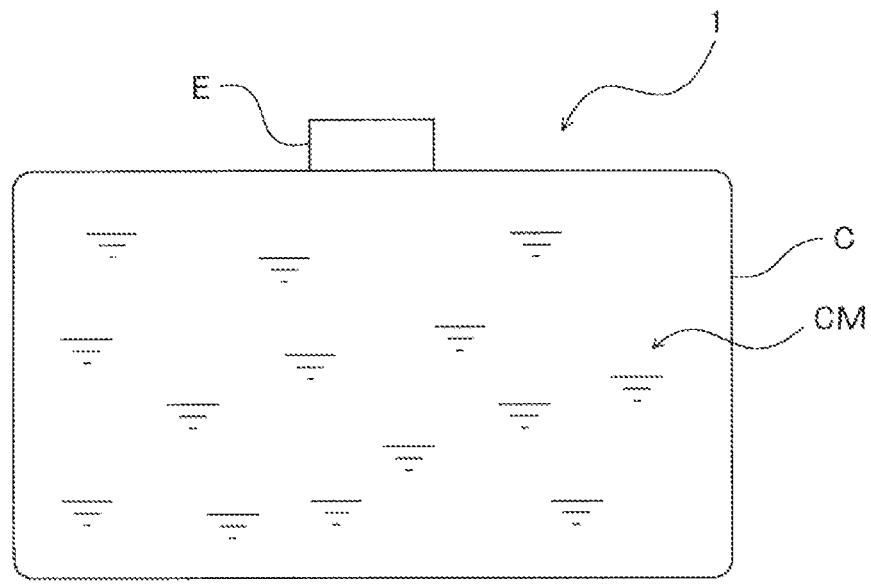
FIG. 1 is a schematic configuration diagram illustrating a latent heat storage body according to a first embodiment.

FIG. 1 is a schematic configuration diagram illustrating a latent heat storage body according to a first embodiment. As illustrated in FIG. 1, the latent heat storage body 1 according to the first embodiment is one in which a component material CM is encapsulated in a container C. The component material CM is supplied into the container C through a sealable filling port E provided in the container C.

The component material CM is configured of a latent heat storage material, a temperature-sensitive material, and water. For example, the latent heat storage material is configured of an inorganic salt hydrate ($Na_2SO_4 10H_2O$ and $CaCl_2 6H_2O$) and has a phase change temperature (melting point and freezing point) in a specific temperature range (for example, around 21° C.). In this latent heat storage material, the phase change temperature varies according to the solution concentration.

The temperature-sensitive material exhibits different functions at a temperature equal to or higher than a specific temperature and at a temperature lower than the specific temperature, and in the first embodiment, is a polymer that exhibits hydrophilicity at a temperature equal to or higher than the upper critical solution temperature (specific temperature) and exhibits hydrophobicity at a temperature lower than the upper critical solution temperature.

Examples of the polymer having the upper critical solution temperature include vinyl ether polymers or ureido polymers with imidazolium salt in their side chains, and preferably include sulfobetaine gel. This is because the upper critical solution temperature of sulfobetaine gel is around the room temperature and also the technique for adjusting the upper critical solution temperature is known, which makes it easy to set an appropriate upper critical solution temperature.

Next, the function of the latent heat storage body 1 according to the first embodiment will be described. First, it is assumed that the temperature of the latent heat storage material (ambient temperature of the temperature-sensitive material) is equal to or higher than the upper critical solution temperature. In this case, the temperature-sensitive material exhibits hydrophilicity. Accordingly, the temperature-sensitive material retains the surrounding moisture. Therefore, the component material CM behaves in such a way that an amount of moisture is decreased, and the latent heat storage material is in a state as if the solution concentration is increased. As a result, the phase change temperature rises.

On the other hand, it is assumed that the temperature of the latent heat storage material is lower than the upper critical solution temperature. In this case, the temperature-sensitive material exhibits hydrophobicity. Therefore, the temperature-sensitive material releases the retained moisture. Therefore, the component material CM behaves in such a way that an amount of moisture is increased, and the latent heat storage material is in a state as if the solution concentration is lowered. As a result, the phase change temperature falls.

As described above, the latent heat storage body 1 according to the first embodiment changes the phase change temperature by using the function of the temperature-sensitive material according to ambient temperature. Then, this latent heat storage body 1 may be set to a low temperature setting (for example, 18° C.) by lowering the phase change temperature by the function of the temperature-sensitive material when the ambient temperature is lower than the upper critical solution temperature, and set to a high temperature setting (for example, 26° C.) by increasing the phase change temperature by the function of the temperature-sensitive material when the ambient temperature is equal to or higher than the upper critical solution temperature. At this time, it is not necessary to touch the container C of the latent heat storage body 1 with a hand, and also no electric signal or power is required.

In addition, in the first embodiment, since there is always a liquid phase in the vicinity of the phase change temperature at the intended low temperature setting and high temperature setting, the polymer dispersed in the liquid phase is always in such a state that adsorption and retainment or release of the moisture is possible. Further, while the latent heat storage material at the high temperature setting is generally precipitated at the freezing point or lower, a certain portion is dissolved in the liquid phase and in an equilibrium state. In this situation, when the moisture is released from the polymer, the equilibrium state is broken, and the latent heat storage material is dissolved again and the low temperature setting is set.

As described above, the latent heat storage body 1 according to the first embodiment includes the temperature-sensitive material that exhibits different functions at the temperature equal to or higher than the specific temperature and at the temperature lower than the specific temperature, and changes the phase change temperature by using the function of the temperature-sensitive material according to the ambient temperature. Therefore, the latent heat storage body 1 according to the first embodiment does not need to include the latent heat storage material for low temperature use and the latent heat storage material for high temperature use, and is capable of self-adjusting the phase change temperature.

In addition, the phase change temperature may be set to the low temperature setting or the high temperature setting according to the ambient temperature in that, for example, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

Further, the latent heat storage body 1 may include a component material CM containing a latent heat storage material, and have uneven distribution of a specific component (latent heat storage material) of the component material CM in concentration caused by the function of the temperature-sensitive material according to the temperature of the latent heat storage material, thereby self-adjusting the phase change temperature.

Further, since the temperature-sensitive material is a polymer that exhibits hydrophilicity at the temperature equal to or higher than the upper critical solution temperature and exhibits hydrophobicity at the temperature lower than the upper critical solution temperature, when exhibiting hydrophilicity at the temperature equal to or higher than the upper critical solution temperature, the temperature-sensitive material may be combined with surrounding moisture so that the latent heat storage material is in a state as if the solution concentration is increased and the phase change temperature is increased. On the other hand, when exhibiting hydrophobicity at the temperature lower than the upper critical solution temperature, the temperature-sensitive material can be separated from surrounding moisture so that the latent heat storage material is in a state as if the solution concentration is lowered and the phase change temperature is decreased. As described above, the phase change temperature may be changed by adjusting the apparent solution concentration.

Next, a second embodiment of the present invention will be described. The latent heat storage body 1 according to the second embodiment is similar to that of the first embodiment, except for certain differences in configuration. Hereinafter, the differences from the first embodiment will be described.

The component material CM of the latent heat storage body 1 according to the second embodiment includes a latent heat storage material, a temperature-sensitive material, water, and an inverse freezing point depressant. It is known that the inverse freezing point depressant is configured of a hydrated salt (e.g., $ZnCl_2$) having a plurality of degrees of hydration having different orders, and lowers the phase change temperature in accordance with an increase in the amount of moisture, for example. Specifically, the $ZnCl_2$ illustrated in FIG. 1 of JP-A-58-180579 has different degrees of hydration ($ZnCl_2 \cdot 0.5H_2O$, $ZnCl_2 H_2O$, $ZnCl_2 \cdot 1.5H_2O$, etc.), and lowers the freezing point (phase change temperature) as the order increases. Such a hydrated salt, which may be referred to as a freezing point depressant or as an eutectic material, is referred to as an inverse freezing point depressant in the present embodiment, because the phase change temperature of a general freezing point depressant is less likely to decrease due to an increase in the amount of moisture.

In the second embodiment, the temperature-sensitive material is a polymer that exhibits hydrophilicity at a temperature equal to or higher than an upper critical solution temperature (specific temperature) and exhibits hydrophobicity at a temperature lower than the upper critical solution temperature.

In the latent heat storage body 1 according to the second embodiment as described above, first, it is assumed that the temperature of the latent heat storage material (ambient temperature of the temperature-sensitive material) is equal to or higher than the upper critical solution temperature. In this case, the temperature-sensitive material exhibits hydrophilicity. Accordingly, the temperature-sensitive material retains the surrounding moisture. Therefore, the component material CM behaves in such a way that an amount of moisture is decreased, weakening the function of the inverse freezing point depressant of lowering the phase change temperature according to the amount of moisture. As a result, the phase change temperature rises.

On the other hand, it is assumed that the temperature of the latent heat storage material is lower than the upper critical solution temperature. In this case, the temperature-sensitive material exhibits hydrophobicity. Therefore, the temperature-sensitive material releases the retained moisture. Therefore, the component material CM behaves in such a way that the amount of moisture is increased, strengthening the function of the inverse freezing point depressant of lowering the phase change temperature according to the increase of the amount of moisture. As a result, the phase change temperature falls.

As described above, with the latent heat storage body 1 according to the second embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

In addition, in the second embodiment, the temperature-sensitive material is a polymer that exhibits hydrophilicity at the temperature equal to or higher than the upper critical solution temperature as the specific temperature and exhibits hydrophobicity at the temperature lower than the upper critical solution temperature. Therefore, when exhibiting hydrophilicity at the temperature equal to or higher than the upper critical solution temperature, the polymer may be combined with the surrounding moisture to reduce an amount of moisture for the latent heat storage material, thereby increasing the phase change temperature. On the other hand, when exhibiting hydrophobicity at the temperature lower than the upper critical solution temperature, the polymer may be separated from the surrounding moisture to increase the amount of moisture for the latent heat storage material, thereby lowering the phase change temperature. As described above, the phase change temperature may be changed by adjusting the amount of moisture for the latent heat storage material.

Next, a third embodiment of the present invention will be described. The latent heat storage body 1 according to the third embodiment is similar to that of the first embodiment, except for certain differences in configuration. Hereinafter, the differences from the first embodiment will be described.

The component material CM of the latent heat storage body 1 according to the third embodiment includes a latent heat storage material, a temperature-sensitive material, water, and a freezing point depressant. The freezing point depressant lowers the phase change temperature as the molar concentration increases.

In addition, in the third embodiment, the temperature-sensitive material is a polymer that exhibits hydrophobicity at a temperature equal to or higher than the lower critical solution temperature (specific temperature) and exhibits hydrophilicity at a temperature lower than the lower critical solution temperature.

In the latent heat storage body 1 according to the third embodiment as described above, first, it is assumed that the temperature of the latent heat storage material (ambient temperature of the temperature-sensitive material) is equal to or higher than the lower critical solution temperature. In this case, the temperature-sensitive material exhibits hydrophobicity. Accordingly, rather than retaining the surrounding moisture, the temperature-sensitive material releases it. Therefore, the component material CM behaves in such a way that the amount of moisture is increased, and the apparent molar concentration of the freezing point depressant decreases. As a result, the phase change temperature rises.

On the other hand, it is assumed that the temperature of the latent heat storage material is lower than the lower critical solution temperature. In this case, the temperature-sensitive material exhibits hydrophilicity. Accordingly, the temperature-sensitive material retains the surrounding moisture. Therefore, the component material CM behaves in such a way that the amount of moisture is decreased, and the apparent molar concentration of the freezing point depressant increases. As a result, the phase change temperature falls.

Further, in the third embodiment, it is necessary to pay attention to the amount of moisture such that there is always the liquid phase in the vicinity of the phase change temperature at the intended tow temperature setting and high temperature setting.

As described above, with the latent heat storage body 1 according to the third embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

Further, in the third embodiment, the temperature-sensitive material is a polymer that exhibits hydrophobicity at the temperature equal to or higher than the lower critical solution temperature as the specific temperature and hydrophilicity at the temperature lower than the lower critical solution temperature. Therefore, when exhibiting hydrophobicity at the temperature equal to or higher than the lower critical solution temperature, the polymer may be separated from the surrounding moisture to lower the apparent molar concentration of the freezing point depressant, thereby increasing the phase change temperature. On the other hand, when exhibiting hydrophilicity at the temperature lower than the lower critical solution temperature, the polymer may be combined with the surrounding moisture to increase the apparent molar concentration of the freezing point depressant, thereby lowering the phase change temperature. As described above, the phase change temperature may be changed by adjusting the apparent molar concentration of the freezing point depressant.

Next, a fourth embodiment of the present invention will be described. The latent heat storage body 1 according to the fourth embodiment is similar to that of the first embodiment, except for certain differences in configuration. Hereinafter, the differences from the first embodiment will be described.

The component material CM of the latent heat storage body 1 according to the fourth embodiment includes a latent heat storage material, a temperature-sensitive material, and a freezing point depressant. The freezing point depressant lowers the phase change temperature as the molar concentration increases, and has a hydrophobic group.

Further, in the fourth embodiment, the temperature-sensitive material is a polymer poly(N-isopropylacrylamide) (PNIPAAm)) that becomes hydrophobic at a temperature equal to or higher than the lower critical solution temperature (specific temperature) to adsorb the freezing point depressant having the hydrophobic group, and becomes hydrophilic at a temperature lower than the lower critical solution temperature to release the freezing point depressant having the hydrophobic group.

In the latent heat storage body 1 according to the fourth embodiment as described above, first, it is assumed that the temperature of the latent heat storage material (ambient temperature of the temperature-sensitive material) is equal to or higher than the lower critical solution temperature. In this case, the temperature-sensitive material exhibits hydrophobicity. Accordingly, the temperature-sensitive material retains the surrounding freezing point depressant. Therefore, the component material CM behaves in such a way that the freezing point depressant is decreased, and the apparent molar concentration of the freezing point depressant decreases. As a result, the phase change temperature rises.

On the other hand, it is assumed that the temperature of the latent heat storage material is lower than the lower critical solution temperature. In this case, the temperature-sensitive material exhibits hydrophilicity. Accordingly, the temperature-sensitive material releases the retained freezing point depressant. Therefore, the component material CM behaves in such a way that the freezing point depressant is increased, and the apparent molar concentration of the freezing point depressant increases. As a result, the phase change temperature falls.

As described above, with the latent heat storage body 1 according to the fourth embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

Furthermore, in the fourth embodiment, the latent heat storage body 1 includes the freezing point depressant that lowers the phase change temperature as the molar concentration increases and that has a hydrophobic group. In addition, the temperature-sensitive material becomes hydrophobic at the temperature equal to or higher than the lower critical solution temperature as the specific temperature to adsorb the freezing point depressant having the hydrophobic group, and becomes hydrophilic at the temperature lower than the lower critical solution temperature to release the freezing point depressant having the hydrophobic group. Therefore, when the temperature-sensitive material becomes hydrophobic at the temperature equal to or higher than the lower critical solution temperature to adsorb the freezing point depressant having the hydrophobic group, the apparent molar concentration of the freezing point depressant may be lowered, thereby increasing the phase change temperature. On the other hand, when the temperature-sensitive material becomes hydrophilic at the temperature lower than the lower critical solution temperature to release the freezing point depressant having the hydrophobic group, the apparent molar concentration of the freezing point depressant may be increased, thereby lowering the phase change temperature. As described above, the phase change temperature may be changed by adjusting the apparent molar concentration of the freezing point depressant.

Next, a fifth embodiment of the present invention will be described. The latent heat storage body 1 according to the fifth embodiment is similar to that of the first embodiment, except for certain differences in configuration. Hereinafter, the differences from the first embodiment will be described.

The component material CM of the latent heat storage body 1 according to the fifth embodiment includes a latent heat storage material, a temperature-sensitive material, and a freezing point depressant. The freezing point depressant is a salt that lowers the phase change temperature as the molar concentration increases and that has a hydrophobic group.

In addition, in the fifth embodiment, the temperature-sensitive material is a gel obtained by copolymerizing a polymer having an upper critical solution temperature (specific temperature) and an ion exchange resin, and exhibits an ion adsorption property (adsorption property to anions or cations) at a temperature equal to or higher than the upper critical solution temperature. Because the ion exchange resin has a property of preferentially adsorbing those with a small ionic radius, and especially, those with a large nuclear charge, mixing a salt that ionizes such anions into the freezing point depressant can result in adsorption to the temperature-sensitive material, when temperature condition is satisfied. The same applies when a salt ionizing cations having a smaller ionic radius or a higher valence than the latent heat storage material is mixed into the freezing point depressant.

In the latent heat storage body 1 according to the fifth embodiment as described above, first, it is assumed that the temperature of the latent heat storage material (ambient temperature of the temperature-sensitive material) is lower than the upper critical solution temperature. In this case, the temperature-sensitive material does not exhibit the ion adsorption property, and the freezing point depressant is dispersed in the latent heat storage material. Therefore, the freezing point depressant appropriately functions and the phase change temperature is lowered.

On the other hand, it is assumed that the temperature of the latent heat storage material is equal to or higher than the upper critical solution temperature. In this case, the temperature-sensitive material exhibits an ion adsorption property. Accordingly, the temperature-sensitive material adsorbs ions of the freezing point depressant, and the apparent molar concentration of the freezing point depressant decreases. As a result, the phase change temperature rises.

As described above, with the latent heat storage body 1 according to the fifth embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

Furthermore, in the fifth embodiment, the temperature-sensitive material is a gel obtained by copolymerizing a polymer having an upper critical solution temperature as the specific temperature and an ion exchange resin. Therefore, when the temperature-sensitive material exhibits an ion adsorption property at the temperature equal to or higher than the upper critical solution temperature, the ions of the freezing point depressant may be adsorbed at the temperature equal to or higher than the upper critical solution temperature to decrease the apparent molar concentration of the freezing point depressant, thereby increasing the phase change temperature. On the other hand, at a temperature lower than the upper critical solution temperature, the ions of the freezing point depressant may not be adsorbed and the apparent molar concentration of the freezing point depressant increases, thereby lowering the phase change temperature. Therefore, the phase change temperature may be changed by adjusting the apparent molar concentration of the freezing point depressant.

Next, a sixth embodiment of the present invention will be described. The latent heat storage body 1 according to the sixth embodiment is similar to that of the first embodiment, except for certain differences in configuration. Hereinafter, the differences from the first embodiment will be described.

The component material CM of the latent heat storage body 1 according to the sixth embodiment includes a latent heat storage material and a temperature-sensitive material, in the sixth embodiment, the temperature-sensitive material is an ionic liquid that is separated from the latent heat storage material and forms another layer at a temperature equal to or higher than a lower critical solution temperature (specific temperature), and becomes hydrophilic and is dispersed in the latent heat storage material at a temperature lower than the lower critical solution temperature to function as a freezing point depressant.

As the ionic liquid, for example, tetrabutylphosphonium trifluoroacetate ([P4444]CF3COO) and the like are known as those exhibiting an LCST type phase transition. It is known that the phase transition temperature varies according to the length of the straight chain portion of the cation enclosed inside [ ] and the hydrophilicity of the anion outside [ ], and the like, and is also influenced by the concentration of other salts, and so an appropriate one may be selected according to the type and concentration of the latent heat storage material of interest.

In the latent heat storage body 1 according to the sixth embodiment as described above, first, it is assumed that the temperature of the latent heat storage material (ambient temperature of the temperature-sensitive material) is equal to or higher than the lower critical solution temperature. In this case, the temperature-sensitive material does not disperse in the latent heat storage material because it is separated from the latent heat storage material and forms another layer. Therefore, the freezing point depressant does not function and the phase change temperature rises.

On the other hand, it is assumed that the temperature of the latent heat storage material is lower than the lower critical solution temperature. In this case, the temperature-sensitive material becomes hydrophilic and is dispersed in the latent heat storage material to function as a freezing point depressant. Therefore, the freezing point depressant appropriately functions and the phase change temperature is lowered.

As described above, with the latent heat storage body 1 according to the sixth embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

Furthermore, according to the sixth embodiment, the temperature-sensitive material is an ionic liquid that is separated from the latent heat storage material and forms another layer at a temperature equal to or higher than a lower critical solution temperature as the specific temperature, and becomes hydrophilic and is dispersed in the latent heat storage material at a temperature lower than the lower critical solution temperature to function as the freezing point depressant. Therefore, at the temperature equal to or higher than the lower critical solution temperature, the ionic liquid does not function as the freezing point depressant due to layer separation, and the phase change temperature may be increased. On the other hand, at a temperature lower than the lower critical solution temperature, the ionic liquid becomes hydrophilic and is dispersed in the latent heat storage material to function as a freezing point depressant, and the phase change temperature may be lowered. Therefore, the phase change temperature may be changed by the ionic liquid.

Next, a seventh embodiment of the present invention will be described. The latent heat storage body 1 according to the seventh embodiment is similar to that of the first embodiment, except for certain differences in configuration. Hereinafter, the differences from the first embodiment will be described.

The component material CM of the latent heat storage body 1 according to the seventh embodiment includes a latent heat storage material and a temperature-sensitive material. In the seventh embodiment, the latent heat storage material has a minimum eutectic point at which two components are mixed. For example, the two components are $CaCl_2$-$6H_2O$ and $AlCl_3$-$6H_2O$. The latent heat storage material may contain three or more components.

The temperature-sensitive material exhibits an ion adsorption property at a temperature equal to or higher than the specific temperature or at a temperature lower than the specific temperature to adsorb ions of the first component or the second component of the latent heat storage material more than ions of the other component. In the seventh embodiment, the temperature-sensitive material is a gel obtained by copolymerizing a polymer having an upper critical solution temperature (specific temperature) and an ion exchange resin, and exhibits an ion adsorption property at the temperature equal to or higher than the upper critical solution temperature to adsorb the ions of the second component more than the ions of the first component.

In the latent heat storage body 1 according to the seventh embodiment as described above, it is assumed that the temperature of the latent heat storage material (ambient temperature of the temperature-sensitive material) is lower than the upper critical solution temperature. In this case, the temperature-sensitive material does not exhibit the ion adsorption property, and the phase change temperature is based on the mixing ratio of the two components.

On the other hand, when the temperature of the latent heat storage material is equal to or higher than the upper critical solution temperature, the temperature-sensitive material exhibits an ion adsorption property to adsorb the ions of the second component more than the ions of the first component. At this time, for example, by using a polymer having cation adsorption property, trivalent $Al^{3+}$ may be adsorbed more than divalent $Ca^{2+}$. As a result, the phase change temperature may be raised by breaking the component ratio of the latent heat storage material and thus setting the component ratio away from the ratio at the minimum eutectic point.

The temperature-sensitive material is a gel obtained by copolymerizing a polymer having a lower critical solution temperature (specific temperature) and an ion exchange resin, and may exhibit an ion adsorption property at a temperature lower than the lower critical solution temperature to adsorb the ions of the second component more than the ions of the first component. In this case, when the temperature of the latent heat storage material is equal to or higher than the lower critical solution temperature, the phase change temperature is based on the mixing ratio of the two components. On the other hand, when the temperature of the latent heat storage material is lower than the lower critical solution temperature, the phase change temperature may be lowered by bringing the component ratio close to the ratio at which the minimum eutectic point is reached.

As described above, with the latent heat storage body 1 according to the seventh embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

Further, in the seventh embodiment, the temperature-sensitive material exhibits an ion adsorption property at the temperature equal to or higher than the specific temperature (upper critical solution temperature) or at a temperature lower than the specific temperature (lower critical solution temperature), the ions of the first component or the second component of the latent heat storage material are adsorbed more than the ions of the other component. Therefore, the phase change temperature may be changed by changing the mixing ratio of the two components.

Next, an eighth embodiment of the present invention will be described. The latent heat storage body 1 according to the eighth embodiment is similar to that of the first embodiment, except for certain differences in configuration. Hereinafter, the differences from the first embodiment will be described.

Figure 2:
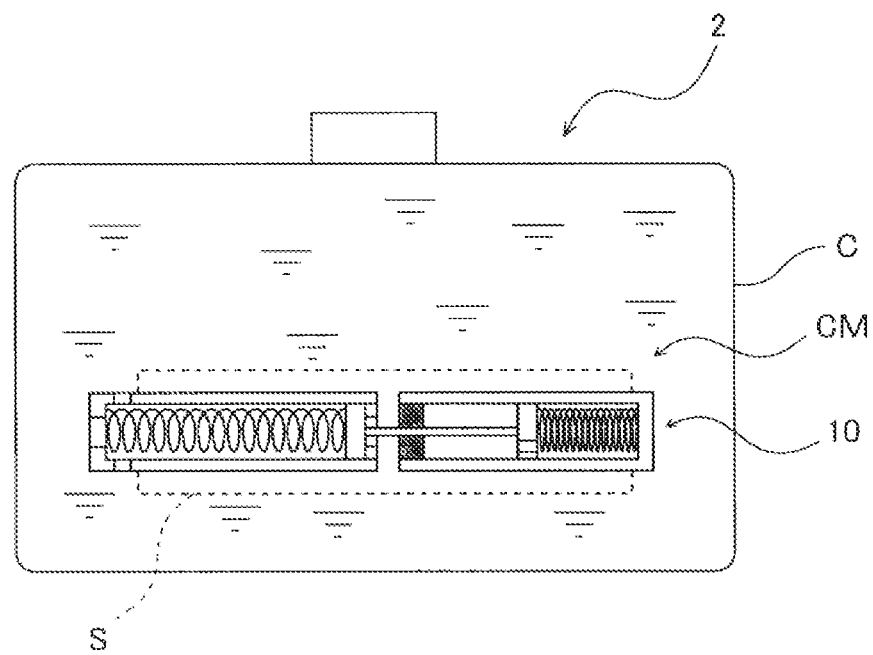
FIG. 2 is a schematic configuration diagram illustrating a latent heat storage body according to an eighth embodiment.

FIG. 2 is a schematic configuration diagram illustrating a latent heat storage body 2 according to the eighth embodiment. As illustrated in FIG. 2, the latent heat storage body 2 according to the eighth embodiment is one in which a component material CM is encapsulated in a container C, as in the first embodiment.

The component material CM includes a latent heat storage material, and optionally, water or a freezing point depressant. The freezing point depressant lowers the phase change temperature as the molar concentration increases.

Furthermore, the latent heat storage body 2 includes a membrane member S and a temperature-sensitive mechanism (temperature-sensitive material) 10. The membrane member S is configured of any one of an ion exchange membrane, a semipermeable membrane, and a molecular sieving membrane.

The ion exchange membrane is one that causes a permeation rate of a specific ion and that of another ion to be different from each other, such as, a positively charged anion exchange membrane, a negatively charged cation exchange membrane, an anion exchange membrane that holds a negative charge, a cation exchange membrane that holds a positive charge, or the like, for example. The positively charged anion exchange membrane preferentially permeates anions, especially polyvalent anions, in addition to hydroxide ions, thereby causing different permeation rate from the other ions. Further, the negatively charged cation exchange membrane preferentially permeates cations, especially polyvalent cations, in addition to hydrogen ions, thereby causing different permeation rate from the other ions. An anion exchange membrane having a surface with a small amount of negative charge repels polyvalent anions and preferentially permeates monovalent anions, thereby causing different permeation rate from other ions. A cation exchange membrane having a surface with a small amount of positive charge repels polyvalent cations and preferentially permeates monovalent cations, thereby causing different permeation rate from other ions.

The semipermeable membrane causes the permeation rate of the ions and that of a solvent (for example, water) to be different from each other. The molecular sieving membrane allows small-sized molecules to permeate preferentially over large-sized molecules. This molecular sieving membrane is a membrane with nano-level pores that is also called molecular sieve and preferentially permeates smaller size molecules.

Further, in the eighth embodiment, the membrane member S is configured in a bag shape having an internal space. In addition, the temperature-sensitive mechanism 10 changes (increases or decreases) the volume of the internal space of the membrane member S at a temperature equal to or higher than a specific temperature and at a temperature lower than the specific temperature. In the eighth embodiment, the volume of the internal space of the membrane member S is changed by the temperature-sensitive mechanism 10, so that the component ratio of the component material CM outside the membrane member S is changed, thereby changing the phase change temperature.

Figure 3:
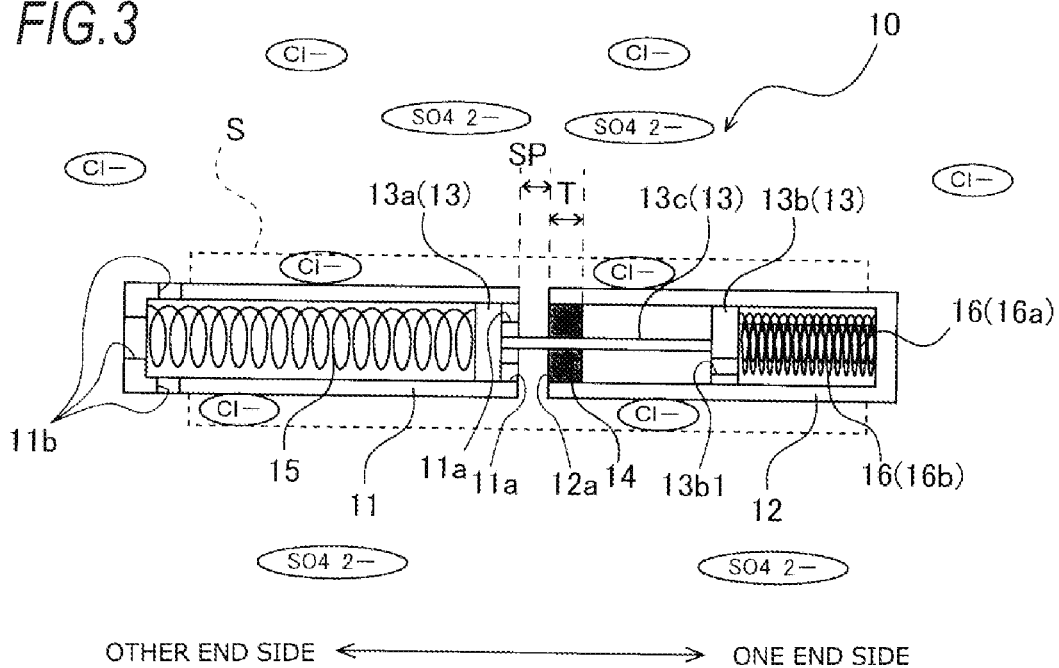
FIG. 3 is an enlarged view illustrating details of a temperature-sensitive mechanism and a membrane member illustrated in FIG. 2.

FIG. 3 is an enlarged view illustrating details of the temperature-sensitive mechanism 10 and the membrane member S illustrated in FIG. 2. As illustrated in FIG. 3, the temperature-sensitive mechanism 10 includes a first sleeve (sleeve) 11, a second sleeve 12, a connecting piston (piston) 13, a floating piston 14, a compression spring 15, and a shape memory alloy (temperature-sensitive member) 16.

The first sleeve 11 is a cylindrical member including openings 11a and 11b on both end sides, with the opening 11a at one end side being connected to the internal space of the membrane member S, and the opening 11b at the other end side being connected to the outside of the internal space of the membrane member S. The first sleeve 11 includes the openings 11a and 11b on both end sides to connect the inside and the outside of the internal space of the membrane member S. Such a first sleeve 11 includes two openings 11a at one end. Further, the first sleeve 11 includes one opening 11b at the other end and two openings 11b at a side wall near the other end.

The second sleeve 12 is a cylindrical member having one end side closed and an opening 12a at the other end side, with the opening 12a at the other end side being connected to the internal space of the membrane member S, and is disposed on one end side of the first sleeve 11 so as to face the first sleeve 11.

The connecting piston 13 is a piston member that is disposed across both the first sleeve 11 and the second sleeve 12. The connecting piston 13 includes a first plate member 13a, a second plate member 13b, and a connecting rod 13c.

The first plate member 13a is a plate member that is provided to be able to slide in close contact in the first sleeve 11 in a longitudinal direction of the cylindrical body, and that separates the inside of the first sleeve into one end side and the other end side. In this example, the one end side of the first sleeve 11 is connected to the internal space of the membrane member S, and the other end side is connected to the outside of the internal space of the membrane member S. Accordingly, the first plate member 13a in the first sleeve 11 functions as a member that isolates the internal space and the outside space of the membrane member S.

The second plate member 13b is a plate member that is provided to be able to slide in close contact in the second sleeve 12 in the longitudinal direction of the cylindrical body. The second plate member 13b includes a through hole 13h1 penetrating the second plate member 13h. In addition, rather than having the through hole 13b1, the second plate member 13b may be provided as a plate member that is sized to have a slight gap with an inner wall of the second sleeve 12.

The connecting rod 13c is a rod-shaped member that connects the first plate member 13a and the second plate member 13b. The connecting rod 13c connects one end side surface of the first plate member 13a and the other end side surface of the second plate member 13b.

The floating piston 14 is a plate member that is provided to be able to slide in close contact in the second sleeve 12 in the longitudinal direction of the cylindrical body, and includes a center opening into which the connecting rod 13c is loosely inserted. With the connecting rod 13c being loosely inserted therein, the floating piston 14 is movable along the connecting rod 13c to one end side or the other end side. Note that, since the floating piston 14 has a thickness T that is greater than a gap SP between the first sleeve 11 and the second sleeve 12, it is not separated from the second sleeve 12. Accordingly, the inside of the second sleeve 12 is a space closed by the floating piston 14 and is in a liquid-sealed or air-sealed state.

The compression spring 15 is disposed in the first sleeve 11 and presses on the other end surface of the first plate member 13a to urge the first plate member 13a toward the one end side.

The shape memory alloy spring 16 is disposed in the second sleeve 12 and does not urge the second plate member 13b to the other end side at a temperature lower than a specific temperature, and urges the second plate member 13b toward the other end side against the urging force of the compression spring 15 at a temperature equal to or higher than the specific temperature.

Note that, for the temperature-sensitive mechanism 10, instead of the shape memory alloy spring 16 that changes its shape according to temperature, a bag body encapsulating a gas-liquid phase change material that is gasified at a temperature equal to or higher than a specific temperature and is liquefied at a temperature lower than the specific temperature, may be used. In this case, inside the bag body, for example, nitrogen dioxide (boiling point 21° C.), acetaldehyde (boiling point 20° C.), 3-methyl-1-butene (isopentene) (boiling point 20° C.), and the like, combined with isopentane (boiling point 28° C.), 1-pentene (boiling point 30° C.), and the like are preferably used. At this time, bag bodies may be prepared for each of the two types of gas-liquid phase change materials, but considering complexity in such arrangement, it is preferable to select a combination that does not react even when mixed and that is not azeotrope, and put it in the same bag.

Figure 4:
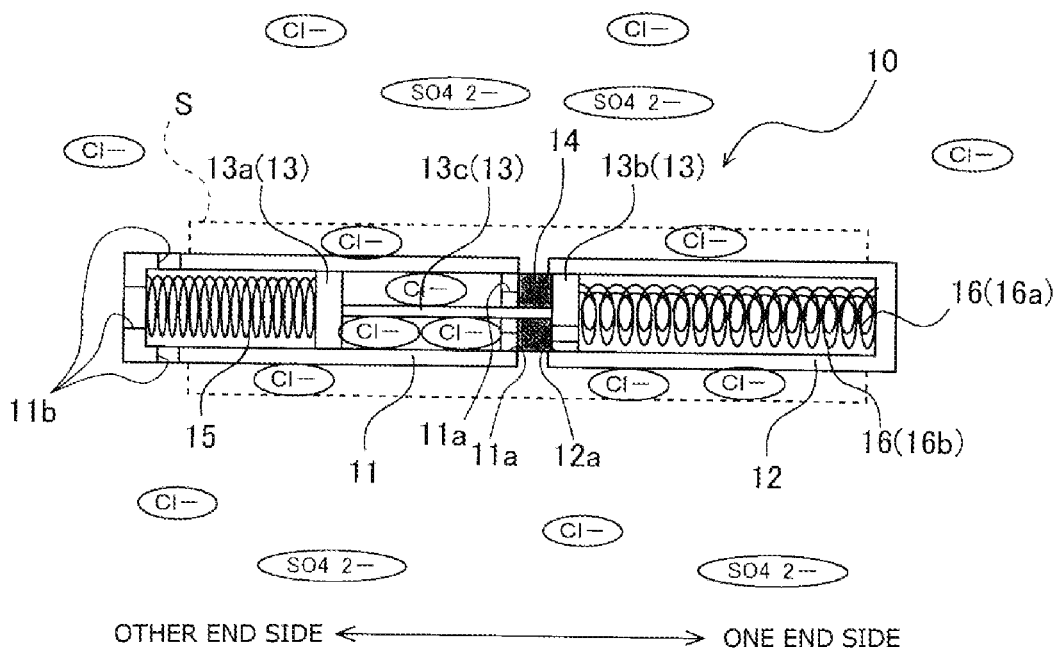
FIG. 4 is an enlarged view illustrating a state of the temperature-sensitive mechanism when at a temperature equal to or higher than a specific temperature.

FIG. 4 is an enlarged view illustrating a state of the temperature-sensitive mechanism 10 when at a temperature equal to or higher than a specific temperature. As is clearly seen from FIG. 3 described above, when ambient temperature of the shape memory alloy spring 16 (the temperature of the latent heat storage material) is lower than the specific temperature, the shape memory alloy spring 16 is in the compressed state. Therefore, the first plate member 13a is urged by the compression spring 15 and moved to the one end side in the first sleeve 11. On the other hand, when the ambient temperature of the shape memory alloy spring 16 is equal to or higher than the specific temperature, the shape memory alloy spring 16 is in the expanded state as illustrated in FIG. 4. Therefore, the second plate member 13b is moved to the other end side in the second sleeve 12, and moves, through the connecting rod 13c, the first plate member 13a to the vicinity of the intermediate position in the first sleeve 11. As a result, the volume of the internal space of the membrane member S (the amount of the component material CM inside the membrane member 5) is changed (increased).

In this example, the shape memory alloy spring 16 preferably has temperature hysteresis. Specifically, the shape memory alloy spring 16 is configured of two concentrically-arranged shape memory alloy springs 16a and 16b. For example, the first shape memory alloy spring 16a is in the compressed state at a temperature lower than 22° C. (first specific temperature) and tends to shift to the expanded state at a temperature equal to or higher than 22° C. (first specific temperature). For example, the second shape memory alloy spring 16b is in the compressed state at a temperature lower than 26° C. (second specific temperature) and tends to shift to the expanded state at a temperature equal to or higher than 26° C. (second specific temperature).

In this example, the compression spring 15 is balanced with the compressive force of each of the two shape memory alloy springs 16a and 16b. However, the shape memory alloy springs 16a and 16h are each soft and do not exert the compressive force at a temperature equal to or lower than respective set temperatures (first specific temperature, second specific temperature). As a result, for example, at a temperature lower than 22° C., the connecting piston 13 is moved to one end side as illustrated in FIG. 3, and at a temperature equal to or higher than 26° C., the connecting piston 13 is moved to the other end side as illustrated in FIG. 4. At a temperature equal to or higher than 22° C. and lower than 26° C., there is a slight imbalance in the force according to the position of the connecting piston 13, but there is no movement due to the frictional resistance between the first plate member 13a and the second plate member 13b and the sleeves 11 and 12 (when the second plate member 13b has a slight gap with the inner wall of the second sleeve 12, due to the frictional resistance between the first plate member 13a and the first sleeve 11).

With this configuration, the temperature-sensitive mechanism 10 may have the temperature hysteresis in that the specific temperature (second specific temperature) when the ambient temperature tends to increase, and the specific temperature (first specific temperature) when the ambient temperature tends to decrease, are different from each other by at least the frictional force between the first plate member 13a of the connecting piston 13 and the first sleeve 11.

Note that, although an example of using two shape memory alloy springs 16a and 16b having different set temperatures has been described above, the hardness of the shape memory alloy spring 16 actually changes gradually over a certain temperature range. Further, the shape memory alloy spring 16 exhibits the hysteresis that a greater compressive force is maintained when the temperature is lowered, than when the temperature rises, after the compression strain is released by the temperature rise. Therefore, if properly designed, the same function may be exhibited with one shape memory alloy spring 16.

Next, the function of the latent heat storage body 2 according to the eighth embodiment will be described with reference to FIGS. 3 and 4, in the following description, the latent heat storage material is $Na_2SO_4 \cdot 10H_2O$, to which NaCl is added as a freezing point depressant, and the membrane member S is a monovalent ion selective permeable anion exchange membrane.

First, in early summer, it is assumed that the latent heat storage material of the latent heat storage body 2 is completely mixed with the freezing point depressant to adjust the melting point to 20° C. and the freezing point to 13° C. In this case, the latent heat storage material is cooled to 18° C. or lower and is completely solidified by the cold heat in the spring, by an auxiliary air conditioner, and the like. At this time, being at a low temperature, the shape memory alloy spring 16 is soft and exerts almost no compressive force. Accordingly, the connecting piston 13 is urged toward one end side by the compression spring 15 and is in the state illustrated in FIG. 3.

During use in summer, the outer peripheral portion of the latent heat storage material gradually melts, and when the underfloor cooling by the nighttime power or the like is also used, there is re-solidification during night, but the central portion of the latent heat storage material (around the temperature-sensitive mechanism 10) is kept solidified at about 20° C., for example.

Around the end of summer, the latent heat storage material is completely dissolved, and the temperature of the central portion also begins to rise above 20° C., and when it reaches 22° C., the first shape memory alloy spring 16a begins to generate a compressive force, but cannot overcome the compression spring 15 due to the relationship with the frictional resistance, and the connecting piston 13 is not moved.

When the central portion of the latent heat storage material reaches 26° C. by the heat of autumn or by the heating of an auxiliary air conditioner, and the like, the second shape memory alloy spring 16b also begins to exert a compressive force. At this time, both shape memory alloy springs 16a and 16b overcome the compression spring 15, and the connecting piston 13 is moved to the other end side as illustrated in FIG. 4.

At this time, the volume of the internal space of the membrane member S increases. Therefore, $Cl^-$ and moisture are drawn into the first sleeve 11 through the membrane member S which is a monovalent ion selective permeable anion exchange membrane. As a result, outside the membrane member S, the concentration of the freezing point depressant with respect to the latent heat storage material decreases and the phase change temperature increases, and the melting point is adjusted to 26° C. and the freezing point is adjusted to 24° C., for example.

In this example, when the $Cl^-$ and moisture are completely drawn into the first sleeve 11 (that is, when the connecting piston 13 is moved to the other end side to the maximum), the connecting piston 13 pushes and moves the floating piston 14 toward the other end side to close the opening 11a at the one end side of the first sleeve 11. As described above, some components of the internal space of the membrane member S are confined in the specific space inside the first sleeve 11, so that the confined components are prevented from being affected by diffusion. That is, since the ion exchange membrane which is the membrane member S is limited to causing the permeation rates of a specific ion and another ion to be different from each other, the component ratios inside and outside the membrane member S become uniform due to the influence of diffusion after a long period of time. However, by confining the specific ions in the first sleeve 11, the increased phase change temperature may be easily maintained without being affected by diffusion.

After that, when the temperature of the latent heat storage material begins to fall below 26° C., the second shape memory alloy spring 16b loses its compressive force, but since the first shape memory alloy spring 16a balances with the compression spring 15 with the frictional resistance, the connecting piston 13 is not moved.

During use in winter, the outer peripheral portion of the latent heat storage material gradually solidifies, and when using underfloor heating such as nighttime power, there is re-dissolution at night, but the central portion of the latent heat storage material is kept dissolved, for example, at about 24° C.

Around the end of winter, the latent heat storage material is completely solidified, and the temperature of the central portion begins to fall below 24° C. In the first sleeve 11, the freezing point depressant is increased, or the amount of solvent is set so that the liquid phase remains.

After that, when the central portion of the latent heat storage material reaches 22° C., the first shape memory alloy spring 16a also loses the compressive force, and the connecting piston 13 is moved to the one end side by the compressive force of the compressive spring 15 as illustrated in FIG. 3. At this time, the surrounding latent heat storage material, which is a sherbet, is drawn into the first sleeve 11 through the opening 11b on the other end side of the first sleeve 11.

When the connecting piston 13 is moved to the one end side, the fluid confined in the first sleeve 11 pushes and moves the floating piston 14 to the other end side. As a result, Cl⁻ and moisture confined in the first sleeve 11 flow out from the opening 11a of the first sleeve 11. The Cl⁻ and moisture permeate the membrane member S and gradually dissolve the surrounding latent heat storage material, while adjusting the melting point of the latent heat storage material to 20° C. and the freezing point to 18° C. Since this reaction is an endothermic reaction, the adjustment is completed while staying in this temperature zone for a certain time or while maintaining the temperature with an auxiliary air conditioner, and the like, as necessary. At that time, the pistons 13 and 14 do not move in reverse unless the temperature exceeds 26° C.

After that, the latent heat storage material is further cooled to, for example, 18° C. and solidified again.

Note that, although only the permeation of anions is described above, permeation of equivalent counter ions is required at the same time, and in this case, a cation exchange membrane capable of permeating Na⁺ ions is also used. A half of the illustrated membrane member S is a monovalent ion selective permeable anion exchange membrane, and the other half is a cation exchange membrane.

Further, the membrane member S is not limited to the ion exchange membrane, and when it is a semipermeable membrane or a molecular sieving membrane, it may be operated in the same manner as described above by configuring the component material CM with the semipermeable membrane or the molecular sieving membrane.

As described above, with the latent heat storage body 2 according to the eighth embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

Further, according to the eighth embodiment, the temperature-sensitive mechanism 10 changes the volume of the internal space of the membrane member S according to whether the temperature is equal to or higher than the specific temperature or lower than the specific temperature, so that the amount of ions and the like that enter the internal space via the membrane member S may be changed. As a result, the phase change temperature may be changed by adjusting the components of the latent heat storage material outside the membrane member 5, and the like.

Further, there is provided the shape memory alloy spring 16 that is disposed in the second sleeve 12 and does not urge the second plate member 13b to the other end side at a temperature lower than a specific temperature, and urges the second plate member 13b toward the other end side against the urging force of the compression spring 15 at a temperature equal to or higher than a specific temperature, and the like. Therefore, at the temperature equal to or higher than the specific temperature, the connecting piston 13 having the second plate member 13h is urged to the other end side, and the first plate member 13a is moved to the other end side of the first sleeve 11. As a result, components and the like may be introduced from the opening 11b on the one end side of the first sleeve 11 via the membrane member S, and the volume of the internal space of the membrane member S is increased. On the other hand, at the temperature lower than the specific temperature, the connecting piston 13 having the second plate member 13b is not urged to the other end side, and the first plate member 13a is moved to the one end side of the first sleeve 11 by the compression spring 15. As a result, the latent heat storage material is introduced into the first sleeve 11 from the other end side of the first sleeve 11, and the volume of the internal space of the membrane member S is reduced. As described above, the phase change temperature may be changed by adjusting the components of the latent heat storage material outside the membrane member S, and the like.

Furthermore, the temperature-sensitive mechanism 10 has the temperature hysteresis in that the specific temperature (second specific temperature) when the ambient temperature tends to increase, and the specific temperature (first specific temperature) when the ambient temperature tends to decrease, are different from each other. Therefore, unless the temperature exceeds or drops below an intermediate temperature by a certain degree, the low temperature setting and the high temperature setting are not switched, and the latent heat storage body 2 without inadvertent switching may be provided.

Although the latent heat storage body 2 according to the eighth embodiment has a structure including the first sleeve 11 and the second sleeve 12, the present invention is not limited thereto, and may include a bag body in which a membrane member S is attached to each surface of a box-shaped frame and a gas-liquid phase change material is encapsulated therein, for example. This is because it also allows to increase or decrease the amount of latent heat storage material or the like inside the membrane member S. In addition, the membrane member S is not limited to the example of configuration in the form of a bag-shaped member having an internal space. For example, the membrane member S may form a closed space together with the outer wall of the container C to partition the inside of the container C. Further, as long as the container C can be used without tilted, the membrane member S may be, for example, one that partitions the inside of the container C into two spaces with the upper part of each space being open.

Next, a ninth embodiment of the present invention will be described. The latent heat storage body 1 according to the ninth embodiment is similar to that of the first embodiment, except for certain differences in configuration. Hereinafter, the differences from the first embodiment will be described.

Figure 5:
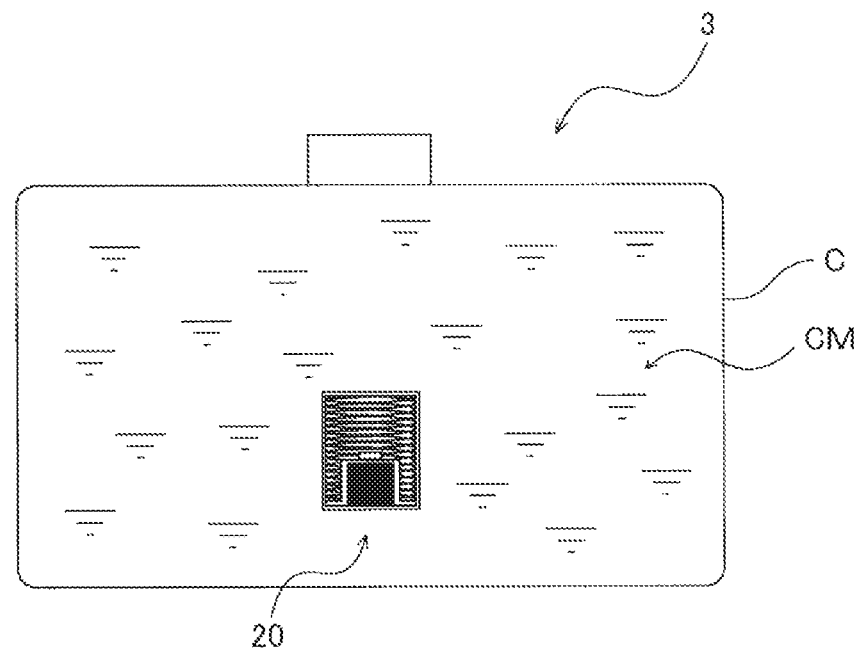
FIG. 5 is a schematic configuration diagram illustrating a latent heat storage body according to a ninth embodiment.

FIG. 5 is a schematic configuration diagram illustrating a latent heat storage body 3 according to the ninth embodiment. As illustrated in FIG. 5 the latent heat storage body 3 according to the ninth embodiment is one in which a component material CM is encapsulated in a container C, as in the first embodiment.

The component material CM includes a latent heat storage material and a freezing point depressant. The freezing point depressant lowers the phase change temperature as the molar concentration increases, and has a component that has magnetism and is dispersed. Examples of such a freezing point depressant include 1-butyl-3-methylimidazolium tetrachlorodisprosate of a water-soluble magnetic ionic liquid having tetrachlorodisprosate as anion as described in JP-A-2007-131608. Although such water-soluble ionic liquid is dispersed as the ionized ions in water, it is considered that anion ($DyCl_4^-$) and cation ($BMIM^+$) are kept close to each other, and for convenience, $DyCl_4^-$ having magnetism will be hereinafter described.

Figure 6:
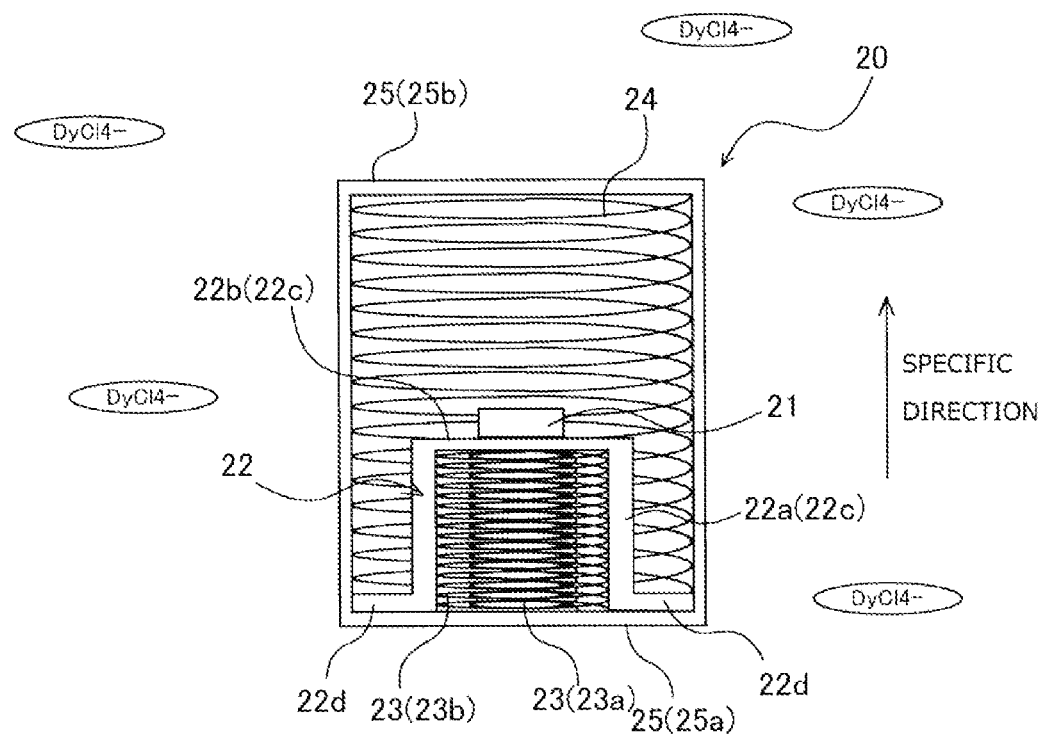
FIG. 6 is an enlarged view illustrating details of a temperature-sensitive mechanism illustrated in FIG. 5.

Furthermore, the latent heat storage body 3 includes a temperature-sensitive mechanism (temperature-sensitive material) 20. FIG. 6 is an enlarged view illustrating details of a temperature-sensitive mechanism 20 illustrated in FIG. 5. As illustrated in FIG. 6, the temperature-sensitive mechanism 20 includes a magnet (magnetic material, permanent magnet) 21, a pedestal 22, a shape memory alloy spring (temperature-sensitive member) 23, a compression spring 24, and a case (partition wall) 25.

The magnet 21 is a permanent magnet such as a neodymium magnet mounted on the pedestal 22. The pedestal 22 includes a base 22c having a bottomed cylindrical shape that includes a cylindrical portion 22a and a bottom wall 22b, and a flange portion 22d extending in the radial direction of the cylindrical body from the open end of the cylindrical portion 22a where the bottom wall 22b is not provided. The magnet 21 is fixedly mounted on the bottom wall 22b.

The shape memory alloy spring 23 is a member that does not exert the compressive force at a temperature lower than a specific temperature, and exerts the compressive force at a temperature equal to or higher than the specific temperature to press the pedestal 22 in a specific direction. More specifically, the shape memory alloy spring 23 is disposed so as to be included in the cylindrical portion 22a, and is configured to exhibit compression when at the temperature equal to or higher than the specific temperature and press the bottom wall 22b of the base 22c from the open side toward the closed side of the base 22c (that is, in the specific direction).

The compression spring 24 is provided opposite to the shape memory alloy spring 23 and exerts the compressive force in the opposite direction to the shape memory alloy spring 23 to press the pedestal 22. More specifically, the compression spring 24 is disposed outside the cylindrical portion 22a so as to surround the cylindrical portion 22a, and is configured to press the flange portion 22d of the pedestal 22 from the closed side toward the open side of the base 22c (that is, in the opposite direction to the specific direction).

The case 25 is a box-shaped member that hermetically accommodates the magnet 21, the pedestal 22, the shape memory alloy spring 23, and the compression spring 24, and serves as a partition wall that separates the space in which the latent heat storage material is accommodated from the internal space (specific space). The shape memory alloy spring 23 described above may exert the compressive force between the lower wall 25a of the case 25 and the bottom \vat' 22b of the pedestal 22, and the compression spring 24 may exert the compressive force between the upper wall 25b of the case 25 and the flange portion 22d of the pedestal 22.

In addition, in the ninth embodiment, instead of the shape memory alloy spring 23, a bag body encapsulating a gas-liquid phase change material that is gasified at a temperature equal to or higher than a specific temperature and is liquefied at a temperature lower than the specific temperature, may be used.

Figure 7:
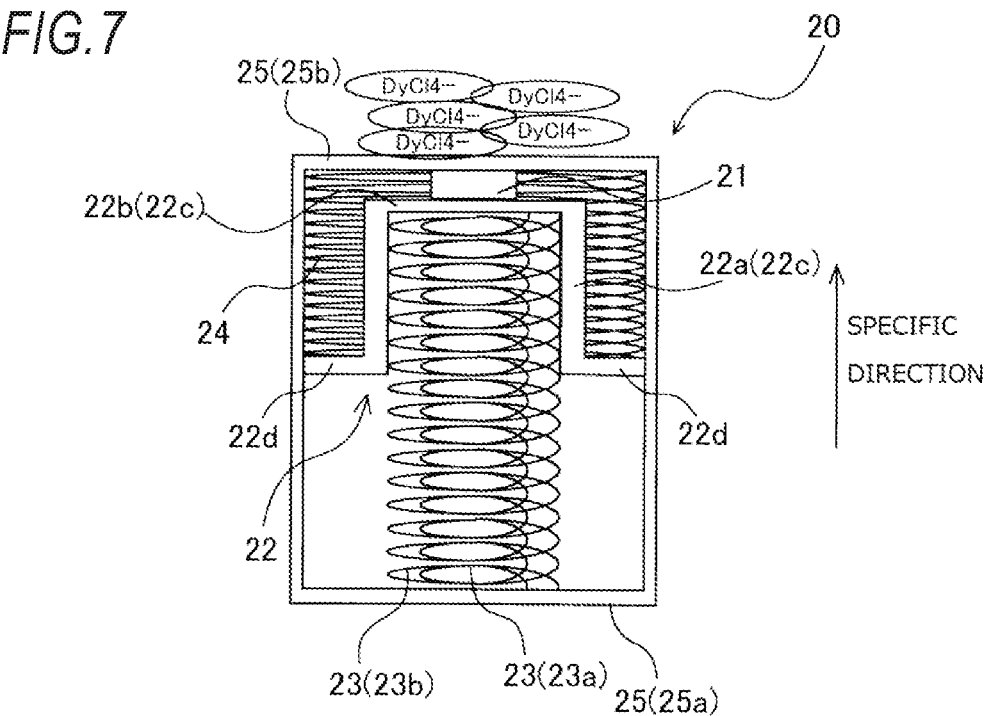
FIG. 7 is an enlarged view illustrating a state of the temperature-sensitive mechanism when at a temperature equal to or higher than a specific temperature.

FIG. 7 is an enlarged view illustrating a state of the temperature-sensitive mechanism 20 when at a temperature equal to or higher than a specific temperature. As is clearly seen from FIG. 6 described above, when ambient temperature of the shape memory alloy spring 23 (temperature-sensitive mechanism 20) (the temperature of the latent heat storage material) is lower than the specific temperature, the shape memory alloy spring 23 is in the compressed state. Accordingly, the flange portion 22d comes into contact with the lower wall 25a of the case 25, and the magnet 21 mounted on the bottom wall 22b of the pedestal 22 is located near the center of the case 25 (at a location separated from the component material CM outside the case 25 by at least a predetermined distance or more). On the other hand, when the ambient temperature of the shape memory alloy spring 23 is equal to or higher than the specific temperature, the shape memory alloy spring 23 is in the expanded state as illustrated in FIG. 7. Accordingly, the magnet 21 is located near the outer wall of the case 25 (in contact with or close to the upper wall 25b).

In this example, also in the ninth embodiment, as in the eighth embodiment, the shape memory alloy spring 23 preferably has the temperature hysteresis, and is configured of two concentrically-arranged shape memory alloy springs 23a and 23h. For example, the first shape memory alloy spring 23a is in the compressed state at a temperature lower than 22° C. (first specific temperature) and tends to shift to an expanded state at a temperature equal to or higher than 22° C. (first specific temperature), and for example, the second shape memory alloy spring 23h is in the compressed state at a temperature lower than 26° C. (second specific temperature) and tends to shift to the expanded state at a temperature equal to or higher than 26° C. (second specific temperature). The compressive force of each of the two shape memory alloy springs 23a and 23h is set to be slightly weaker than the compressive force exerted by the compression spring 24. Note that, if properly designed, the same function may be exhibited with one shape memory alloy spring 23 as in the eighth embodiment.

Next, the function of the latent heat storage body 3 according to the ninth embodiment will be described with reference to FIGS. 6 and 7.

First, in early summer, the latent heat storage material is cooled to 18° C. or lower, for example, and is completely solidified by the cold heat in the spring, by an auxiliary air conditioner, and the like. At this time, being at a low temperature, the shape memory alloy spring 23 is soft and exerts almost no compressive force. Accordingly, the pedestal 22 is urged toward the opposite side in the specific direction by the compression spring 24 and is in the state illustrated in FIG. 6.

During use in summer, the outer peripheral portion of the latent heat storage material gradually melts, and when the underfloor cooling by the nighttime power or the like is also used, there is re-solidification during night, but the central portion of the latent heat storage material (around the temperature-sensitive mechanism 20) is kept solidified at about 20° C., for example.

Around the end of summer, the latent heat storage material is completely dissolved, and the temperature of the central portion begins to rise above 20° C. When the temperature reaches 22° C., the first shape memory alloy spring 23a begins to generate a compressive force, but the compressive force of the first shape memory alloy spring 23a is slightly smaller than the compressive force of the compressive spring 24, and the pedestal 22 is not moved.

When the central portion of the latent heat storage material reaches 26° C. by the heat of autumn or by the heating of an auxiliary air conditioner, and the like, the second shape memory alloy spring 23b also begins to exert a compressive force. At this time, both shape memory alloy springs 23a and 23b overcome the compression spring 24, and the pedestal 22 is moved in the specific direction as illustrated in FIG. 7.

When the pedestal 22 is moved in the specific direction, the magnet 21 is located close to the outer wall of the case 25. Therefore, the magnetic force of the magnet 21 acts on the dysprosium tetrachloride ion ($DyCl_4^-$) which is a component having magnetism in the latent heat storage material. As a result, the dysprosium tetrachloride ion ($DyCl_4^-$) is in a state of being adsorbed to the magnet 21 side, and the concentration of the freezing point depressant in the latent heat storage material is lowered except for the vicinity of the magnet 21. As a result, the phase change temperature of the latent heat storage material increases, and the melting point is adjusted to 26° C. and the freezing point is adjusted to 24° C., for example.

After that, when the temperature of the latent heat storage material begins to fall below 26° C., the second shape memory alloy spring 23b loses the compressive force. However, the pedestal 22 is not moved because the first shape memory alloy spring 23a exerts the compressive force and there also is a force that maintains the magnet 21 and the dysprosium tetrachloride ion ($DyCl_4^-$) attracted to each other.

During use in winter, the outer peripheral portion of the latent heat storage material gradually solidifies, and when using underfloor heating such as nighttime power, there is re-dissolution at night, but the central portion of the latent heat storage material is kept dissolved, for example, at about 24° C.

Around the end of winter, the latent heat storage material is completely solidified, and the temperature of the central portion begins to fall below 24° C., and after that, when the central portion of the latent heat storage material reaches 22° C., the first shape memory alloy spring 23a also loses the compressive force, and the compression spring 24 moves the pedestal 22 to the opposite side in the specific direction by its compressive force as illustrated in FIG. 6. As a result, the magnet 21 is located closed to the center of the case 25, and the magnetic force of the magnet 21 hardly acts on the dysprosium tetrachloride ion ($DyCl_4^-$). Therefore, the dysprosium tetrachloride ion ($DyCl_4^-$) is in a state of being dispersed in the latent heat storage material, and the freezing point depressant appropriately functions in the latent heat storage material. As a result, the phase change temperature of the latent heat storage material decreases, and the melting point is adjusted to 20° C. and the freezing point is adjusted to 18° C., for example.

After that, the latent heat storage material is further cooled to, for example, 18° C. and solidified again.

As described above, with the latent heat storage body 3 according to the ninth embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use.

Furthermore, according to the ninth embodiment, the temperature-sensitive mechanism 20 has the magnet 21 and transitions between a state in which a component having magnetism is adsorbed, and a state in which the component is not adsorbed but dispersed in the latent heat storage material. Therefore, the phase change temperature may be changed for adsorption and for dispersion, by changing the concentration of the freezing point depressant in the region excluding the periphery of the temperature-sensitive mechanism 20.

Further, since the magnet 21 is located close to the outer wall of the case 25 at a temperature equal to or higher than the specific temperature, the magnetic force of the magnet 21 easily acts and the component having magnetism of the freezing point depressant may be adsorbed to the outer wall of the case 25. On the other hand, since the magnet 21 is located close to the center of the case 25 at a temperature lower than the specific temperature, the magnetic force of the magnet 21 hardly acts, and the component having magnetism of the freezing point depressant may be dispersed without being adsorbed to the outer wall of the case 25. As a result, the phase change temperature may be changed by changing the concentration of the freezing point depressant in the region of the case 25 excluding the periphery of the outer wall.

In addition, the temperature-sensitive mechanism 20 has the temperature hysteresis in that the specific temperature (second specific temperature) when the ambient temperature tends to increase, and the specific temperature (first specific temperature) when the ambient temperature tends to decrease, are different from each other, by using the force to maintain the magnet 21 and the component having magnetism in the adsorbed state by the magnetic force, when the magnet 21 adsorbs the magnetic force. Therefore, unless the temperature exceeds or drops below an intermediate temperature by a certain degree, the low temperature setting and the high temperature setting are not switched, and the latent heat storage body 3 more suitable for cooling and heating without inadvertent switching may be provided.

Next, a tenth embodiment of the present invention will be described. The latent heat storage body 4 according to the tenth embodiment is similar to that of the ninth embodiment, except for certain differences in configuration. Hereinafter, the differences from the ninth embodiment will be described.

Figure 8:
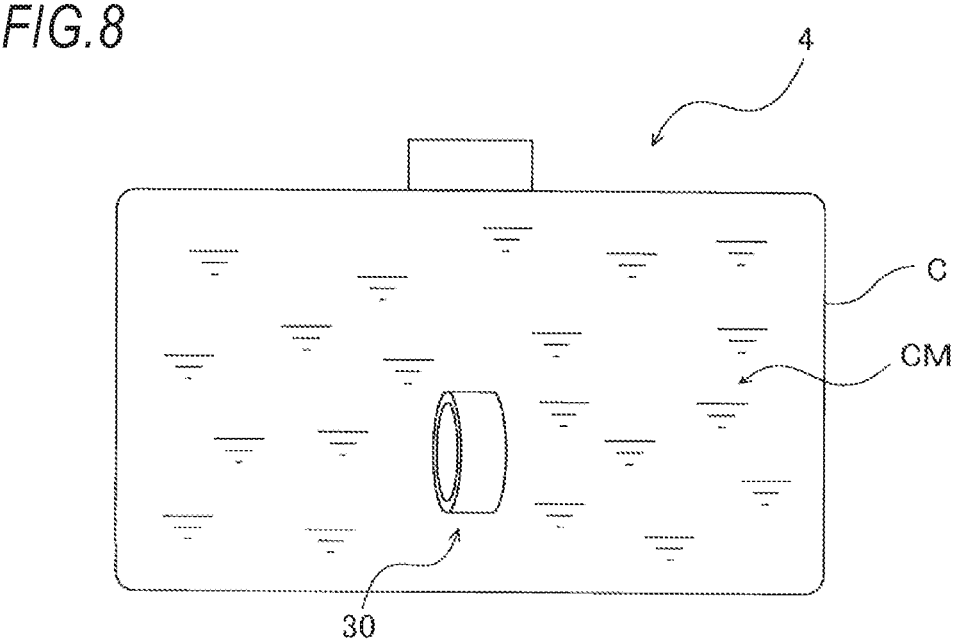
FIG. 8 is a schematic configuration diagram illustrating a latent heat storage body according to a tenth embodiment.

FIG. 8 is a schematic configuration diagram illustrating the latent heat storage body 4 according to the tenth embodiment. As illustrated in FIG. 8, the latent heat storage body 4 according to the tenth embodiment is one in which a component material CM is encapsulated in a container C, as in the ninth embodiment. Like the ninth embodiment, the component material CM includes a latent heat storage material and a freezing point depressant having a component that has magnetism and is dispersed. Hereinafter, the magnetic component will be described as $DyCl_4^-$.

Figure 9:
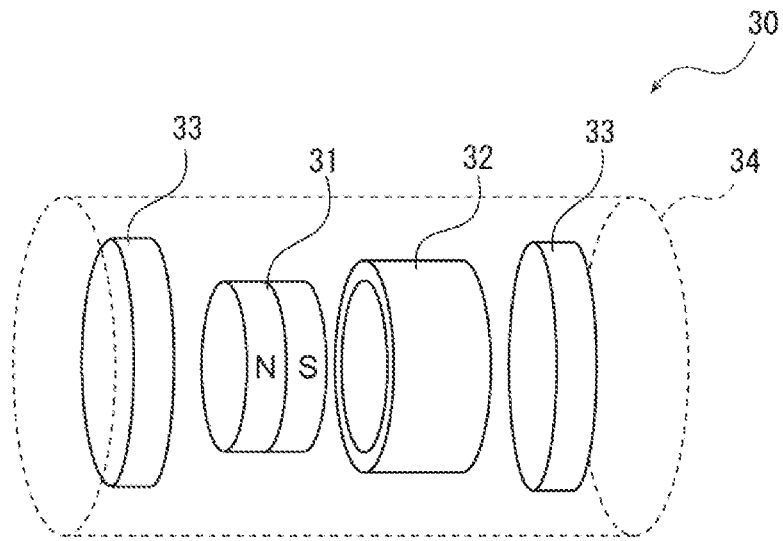
FIG. 9 is an exploded perspective view illustrating details of the temperature-sensitive mechanism illustrated in FIG. 8.

Furthermore, the latent heat storage body 4 includes a temperature-sensitive mechanism (temperature-sensitive material) 30. FIG. 9 is an exploded perspective view illustrating details of the temperature-sensitive mechanism 30 illustrated in FIG. 8. As illustrated in FIG. 9, the temperature-sensitive mechanism 30 includes a magnet (magnetic material, permanent magnet) 31, a temperature-sensitive soft magnetic body sleeve (temperature-sensitive soft magnetic body) 32, two soft iron plates 33, and a hollow container 34.

The magnet 31 is a cylindrical permanent magnet such as a neodymium magnet. The temperature-sensitive soft magnetic body sleeve 32 is a cylindrical temperature-sensitive soft magnetic body that becomes a non-magnetic body at a temperature equal to or higher than a Curie temperature (specific temperature (for example, 24° C.)) and becomes a magnetic body at a temperature lower than the Curie temperature. The magnet 31 is disposed to be surrounded by the cylindrical temperature-sensitive soft magnetic body sleeve 32. Examples of the temperature-sensitive soft magnetic body include Mn—Zn type ferrite manufactured by NEC TOKIN Corporation, and Thermolite (registered trademark). The saturation magnetic flux of the temperature-sensitive soft magnetic body sleeve 32 is set to be higher than the magnetic flux of the magnet 31.

The two soft iron plates 33 are magnetic plate materials configured of soft iron, for example, and are arranged to close both ends of the temperature-sensitive soft magnetic body sleeve 32. These soft iron plates 33 have a larger diameter than the inner wall of the temperature-sensitive soft magnetic body sleeve 32 and are arranged to close both ends of the temperature-sensitive soft magnetic body sleeve 32 from outside of the cylindrical body.

The hollow container 34 is a hollow cylindrical container configured of a non-magnetic body such as resin or austenitic stainless steel, and is configured to cover and house the magnet 31, the temperature-sensitive soft magnetic body sleeve 32, and the two soft iron plates 33.

Figure 10A:
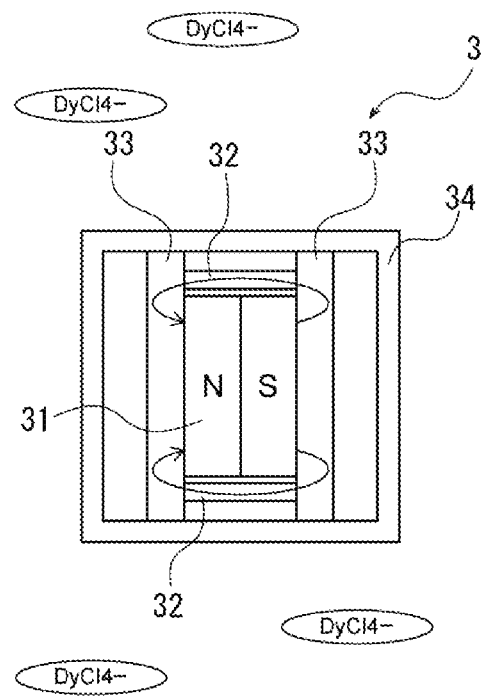
Figure 10B:
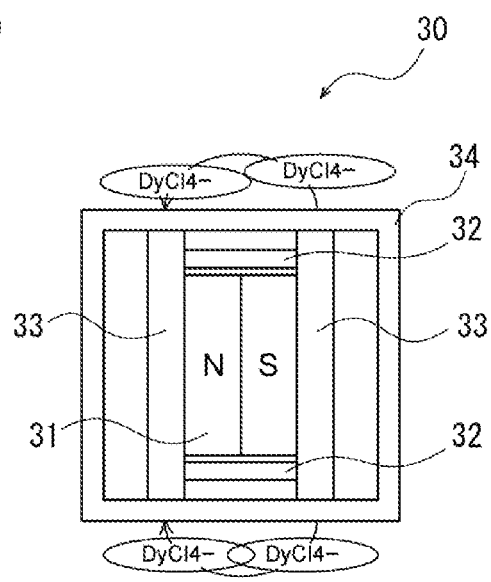

Next, the function of the latent heat storage body 4 according to the tenth embodiment will be described with reference to FIGS. 10A and 10B. FIGS. 10A and 10B are state diagrams for illustrating the function of the latent heat storage body 4 according to the tenth embodiment, in which FIG. 10A illustrates a state at a temperature lower than a Curie temperature, and FIG. 10B illustrates a state at a temperature equal to or higher than a Curie temperature.

First, in early summer, the latent heat storage material is cooled to 18° C. or lower, for example, and is completely solidified by the cold heat in the spring, by an auxiliary air conditioner, and the like, and since the temperature-sensitive soft magnetic body sleeve 32 at a low temperature, it functions as a magnetic body. In this case, the magnet 31 is surrounded by the temperature-sensitive soft magnetic body sleeve 32 which is a magnetic body and by the soft iron plates 33, and the magnetic force hardly acts outside the hollow container 34. Accordingly, as illustrated in FIG. 10A, the dysprosium tetrachloride ion ($DyCl_4^-$) is not adsorbed in the hollow container 34, the freezing point depressant is dispersed in the latent heart storage material, and the phase change temperature of the latent heat storage material remains low. As a result, the latent heat storage material has a melting point of 20° C. and a freezing point of 18° C., for example.

During use in summer, the outer peripheral portion of the latent heat storage material gradually melts, and when the underfloor cooling by the nighttime power or the like is also used, there is re-solidification during night, but the central portion of the latent heat storage material (around the temperature-sensitive mechanism 30) is kept solidified at about 20° C., for example.

Around the end of summer, the latent heat storage material is completely dissolved, and the temperature of the central portion begins to rise above 20° C. After that, when the central portion of the latent heat storage material reaches 24° C. or higher by the heat of autumn or by the heating of an auxiliary air conditioner, and the like, the temperature-sensitive soft magnetic body sleeve 32 functions as a non-magnetic body. Accordingly, the magnet 31 is not surrounded by the magnetic body, and the magnetic force acts outside of the hollow container 34 through the soft iron plates 33. As a result, as illustrated in FIG. 10B, the dysprosium tetrachloride ion ($DyCl_4^-$) is in a state of being adsorbed to the hollow container 34 side, and the concentration of the freezing point depressant in the latent heat storage material is lowered except for the vicinity of the hollow container 34. As a result, the phase change temperature of the latent heat storage material increases, and the melting point is adjusted to 26° C. and the freezing point is adjusted to 24° C., for example.

After that, during use in winter, the outer peripheral portion of the latent heat storage material gradually solidifies, and when using underfloor heating such as nighttime power, there is re-dissolution at night, but the central portion of the latent heat storage material is kept dissolved, for example, at about 26° C.

Around the end of winter, the latent heat storage material is completely solidified, and the temperature of the central portion begins to fall below 24° C., and the temperature-sensitive soft magnetic body sleeve 32 begins to function as a magnetic body. As a result, the magnet 31 is surrounded by the temperature-sensitive soft magnetic body sleeve 32 which is a magnetic body and by the soft iron plates 33. Therefore, as illustrated in FIG. 10A, the dysprosium tetrachloride ion ($DyCl_4^-$) is not adsorbed in the hollow container 34, the freezing point depressant is dispersed in the latent heat storage material, and the phase change temperature of the latent heat storage material remains low. As a result, the latent heat storage material is adjusted to a melting point of 20° C. and a freezing point of 18° C., for example.

After that, the latent heat storage material is further cooled to, for example, 18° C. and solidified again.

As described above, with the latent heat storage body 4 according to the tenth embodiment, like the ninth embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use. Furthermore, the temperature-sensitive mechanism 30 has the magnet 31 and transitions between a state in which a component having magnetism is adsorbed, and a state in which the component is not adsorbed but dispersed in the latent heat storage material. Therefore, the phase change temperature may be changed for adsorption and for dispersion, by changing the concentration of the freezing point depressant in the region excluding the periphery of the temperature-sensitive mechanism 30.

Furthermore, according to the tenth embodiment, the temperature-sensitive mechanism 30 includes the temperature-sensitive soft magnetic body sleeve 32 which is a cylindrical temperature-sensitive soft magnetic body that surrounds the magnet 31, and becomes a non-magnetic body at a temperature equal to or higher than a Curie temperature and becomes a magnetic body at a temperature lower than the Curie temperature, and two soft iron plates 33 that close both ends of the temperature-sensitive soft magnetic body sleeve 32 and has a larger diameter than the inner wall of the temperature-sensitive soft magnetic body sleeve 32. Therefore, at the temperature lower than the Curie temperature, the magnet 31 is surrounded by the magnetic body, so that the magnetic force does not leak outside and the component having magnetism of the freezing point depressant is not adsorbed to the hollow container 34. On the other hand, when the temperature is equal to or higher than the Curie temperature, the magnet 31 is not surrounded by the magnetic body, so that the magnetic force spreads outside the hollow container 34 through the two soft iron plates 33, and the component having magnetism of the freezing point depressant is adsorbed to the hollow container 34. As a result, the phase change temperature may be changed by changing the concentration of the freezing point depressant in the region of the hollow container 34 excluding the periphery.

Next, an eleventh embodiment of the present invention will be described. The latent heat storage body 4 according to the eleventh embodiment is similar to that of the tenth embodiment, except for certain differences in configuration. Hereinafter, the differences from the tenth embodiment will be described.

Figure 11:
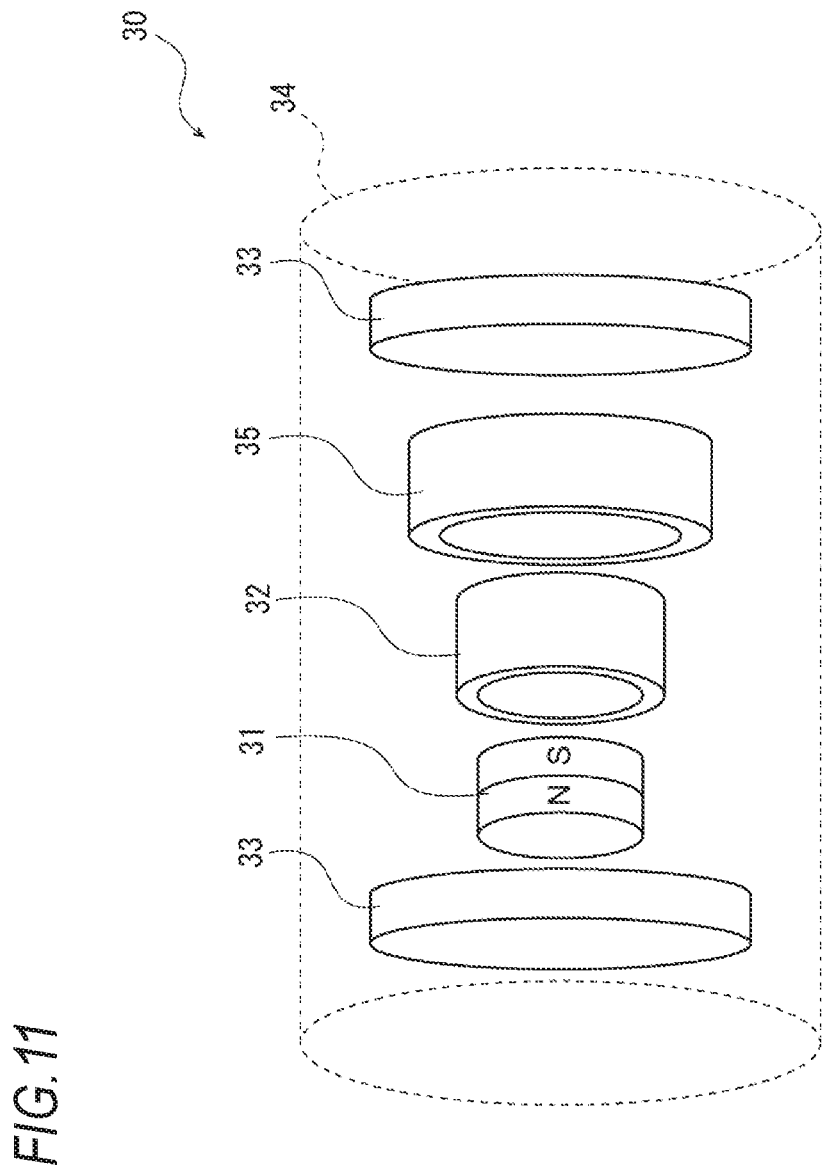
FIG. 11 is an exploded perspective view illustrating a temperature-sensitive mechanism according to an eleventh embodiment.

FIG. 11 is an exploded perspective view illustrating a temperature-sensitive mechanism 30 according to the eleventh embodiment. As illustrated in FIG. 11, the temperature-sensitive mechanism 30 according to the eleventh embodiment further includes, in addition to the configuration illustrated in the tenth embodiment, a second temperature-sensitive soft magnetic body sleeve (temperature-sensitive soft magnetic body) 35, and is configured to have a temperature hysteresis.

The second temperature-sensitive soft magnetic body sleeve 35 is a cylindrical temperature-sensitive soft magnetic body that surrounds the temperature-sensitive soft magnetic body sleeve 32, and becomes a non-magnetic body at a temperature equal to or higher than a second Curie temperature (second specific temperature; 26° C.) higher than the Curie temperature (specific temperature: 22° C., for example) and becomes a magnetic body at a temperature lower than the second Curie temperature. The saturation magnetic flux of each of the temperature-sensitive soft magnetic body sleeve 32 and the second temperature-sensitive soft magnetic body sleeve 35 is set to about half of that of the magnet 31.

Next, the function of the latent heat storage body 4 according to the tenth embodiment will be described with reference to FIGS. 12A to 12C. FIGS. 12A to 12C are state diagrams for illustrating the function of the latent heat storage body 4 according to the tenth embodiment, in which FIG. 12A illustrates a state at a temperature lower than the Curie temperature, FIG. 129 illustrates a state at a temperature equal to or higher than the Curie temperature and lower than the second Curie temperature, and FIG. 12C illustrates a state at a temperature equal to or higher than the second Curie temperature.

First, in the early summer, the latent heat storage material is cooled to 18° C. or lower, for example, and is completely solidified by the cold heat in the spring, by an auxiliary air conditioner, and the like, and the temperature-sensitive soft magnetic body sleeve 32 and the second temperature-sensitive soft magnetic body sleeve 35 function together as the magnetic bodies. At this time, the magnet 31 is surrounded by the temperature-sensitive soft magnetic body sleeve 32 and the second temperature-sensitive soft magnetic body sleeve 35, which are the magnetic bodies, and by the soft iron plates 33, and the magnetic force hardly acts outside the hollow container 34. Accordingly, as illustrated in FIG. 12A, the dysprosium tetrachloride ion ($DyCl_4^-$) is not adsorbed in the hollow container 34, the freezing point depressant is dispersed in the latent heat storage material, and the phase change temperature of the latent heat storage material remains low. As a result, the latent heat storage material has a melting point of 20° C. and a freezing point of 18° C., for example.

During use in summer, the outer peripheral portion of the latent heat storage material gradually melts, and when the underfloor cooling by the nighttime power or the like is also used, there is re-solidification during night, but the central portion of the latent heat storage material (around the temperature-sensitive mechanism 30) is kept solidified at about 20° C., for example.

Around the end of summer, the latent heat storage material is completely dissolved, and the temperature of the central portion begins to rise above 20° C. At 22° C., the temperature-sensitive soft magnetic body sleeve 32 functions as a non-magnetic body. In this example, since the saturation magnetic flux of the second temperature-sensitive soft magnetic body sleeve 35 is set to about a half of that of the magnet 31, about a half of the magnetic flux of the magnet 31 acts outside of the hollow container 34 as illustrated in FIG. 12B. However, the magnetic force at this time is not so large to newly adsorb the dysprosium tetrachloride ions ($DyCl_4^-$) from the surroundings, such that the dysprosium tetrachloride ions ($DyCl_4^-$) are in the dispersed state in the latent heat storage material.

When the central portion of the latent heat storage material reaches 26° C. by the heat of autumn or by the heating of an auxiliary air conditioner, and the like, the second temperature-sensitive soft magnetic body sleeve 35 also functions as a non-magnetic body. As a result, the magnet 31 is not surrounded by the magnetic body, and the magnetic force acts outside of the hollow container 34 through the soft iron plates 33. As a result, as illustrated in FIG. 12C, the dysprosium tetrachloride ion ($DyCl_4^-$) is in a state of being adsorbed to the hollow container 34 side, and the concentration of the freezing point depressant in the latent heat storage material is lowered except for the vicinity of the hollow container 34. As a result, the phase change temperature of the latent heat storage material increases, and the melting point is adjusted to 26° C. and the freezing point is adjusted to 24° C., for example.

After that, when the temperature of the latent heat storage material begins to fall below 26° C., the second temperature-sensitive soft magnetic body sleeve 35 functions as a magnetic body. Accordingly, as illustrated in FIG. 12B, about a half of the magnetic flux of the magnet 31 acts outside of the hollow container 34. This magnetic force is not so large to newly adsorb the dysprosium tetrachloride ions ($DyCl_4^-$) from the surroundings, but is sufficient to maintain the position of the already adsorbed dysprosium tetrachloride ion ($DyCl_4^-$). Therefore, the dysprosium tetrachloride ion ($DyCl_4^-$) is not dispersed in the latent heat storage material, and the phase change temperature of the latent heat storage material remains high.

During use in winter, the outer peripheral portion of the latent heat storage material gradually solidifies, and when using underfloor heating such as nighttime power, there is re-dissolution at night, but the central portion of the latent heat storage material is kept dissolved, for example, at about 24° C.

Around the end of winter, the latent heat storage material is completely solidified, and the temperature of the central portion begins to fall below 24° C., and after that, when the temperature of the central portion of the latent heat storage material reaches 22° C., the temperature-sensitive soft magnetic body sleeve 32 begins to function as a magnetic body. As a result, the magnet 31 is surrounded by the temperature-sensitive soft magnetic body sleeve 32 and the second temperature-sensitive soft magnetic body sleeve 35, which are magnetic bodies, and by the soft iron plates 33. Therefore, as illustrated in FIG. 12A, the dysprosium tetrachloride ion ($DyCl_4^-$) is not adsorbed in the hollow container 34, the freezing point depressant is dispersed in the latent heat storage material, and the phase change temperature of the latent heat storage material remains low. As a result, the latent heat storage material is adjusted to a melting point of 20° C. and a freezing point of 18° C., for example.

After that, the latent heat storage material is further cooled to, for example, 18° C. and solidified again.

As described above, according to the latent heat storage body 4 according to the eleventh embodiment, like the tenth embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use. Furthermore, the temperature-sensitive mechanism 30 has the magnet 31 and transitions between a state in which a component having magnetism is adsorbed, and a state in which the component is not adsorbed but dispersed in the latent heat storage material. Therefore, the phase change temperature may be changed for adsorption and for dispersion, by changing the concentration of the freezing point depressant in the region excluding the periphery of the temperature-sensitive mechanism 30 (hollow container 34).

Furthermore, according to the eleventh embodiment, at the temperature lower than the Curie temperature (specific temperature), both the temperature-sensitive soft magnetic body sleeve 32 and the second temperature-sensitive soft magnetic body sleeve 35 are magnetic bodies, and the component having magnetism is not adsorbed to the hollow container 34. In addition, at the temperature equal to or higher than the second Curie temperature (second specific temperature), both the temperature-sensitive soft magnetic body sleeve 32 and the second temperature-sensitive soft magnetic body sleeve 35 are non-magnetic bodies, and the component having magnetism is adsorbed to the hollow container 34. Further, at the temperature equal to or higher than the Curie temperature (specific temperature) and lower than the second Curie temperature (second specific temperature), the hollow container 34 cannot adsorb the component having magnetism dispersed in the surroundings, but maintains adsorption of the already adsorbed component having magnetism. Therefore, when the ambient temperature tends to rise and reaches the second Curie temperature (second specific temperature), the component having magnetism is adsorbed to the hollow container 34, and when the ambient temperature tends to decrease and reaches the Curie temperature (specific temperature), the component having magnetism is not adsorbed and is dispersed in the latent heat storage material. Accordingly, when there is a temperature hysteresis between the Curie temperature (specific temperature) and the second Curie temperature (second specific temperature), unless the temperature exceeds or drops below an intermediate temperature by a certain degree, the low temperature setting and the high temperature setting are not switched, and the latent heat storage body 4 without inadvertent switching may be provided.

Next, a twelfth embodiment of the present invention will be described. The latent heat storage body 5 according to the twelfth embodiment is similar to that of the first embodiment, except for certain differences in configuration. Hereinafter, the differences from the first embodiment will be described.

Figure 13A:
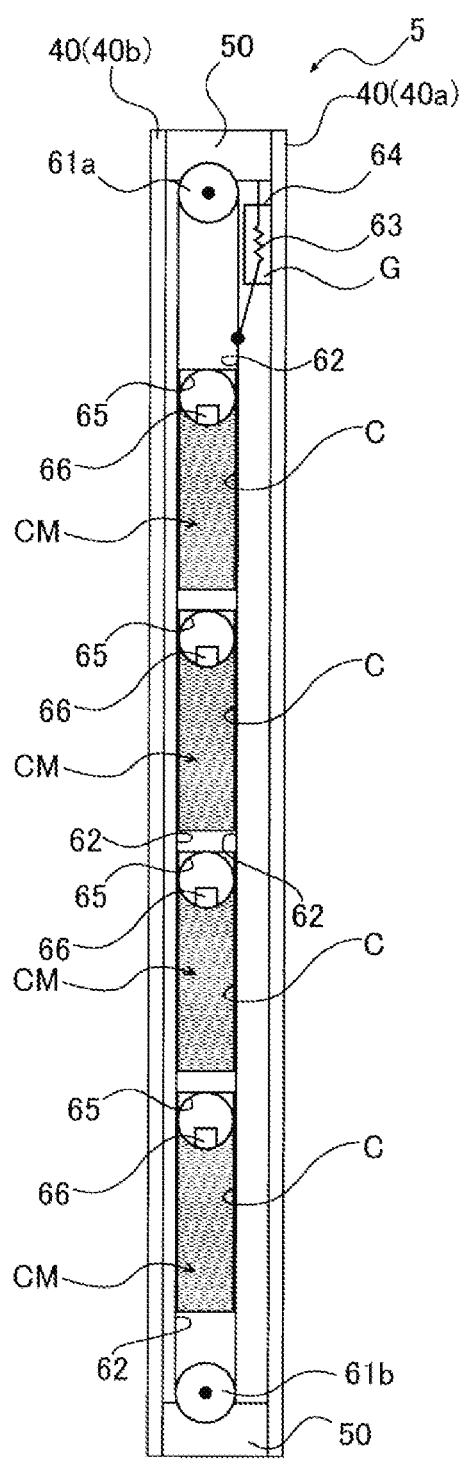
Figure 13B:
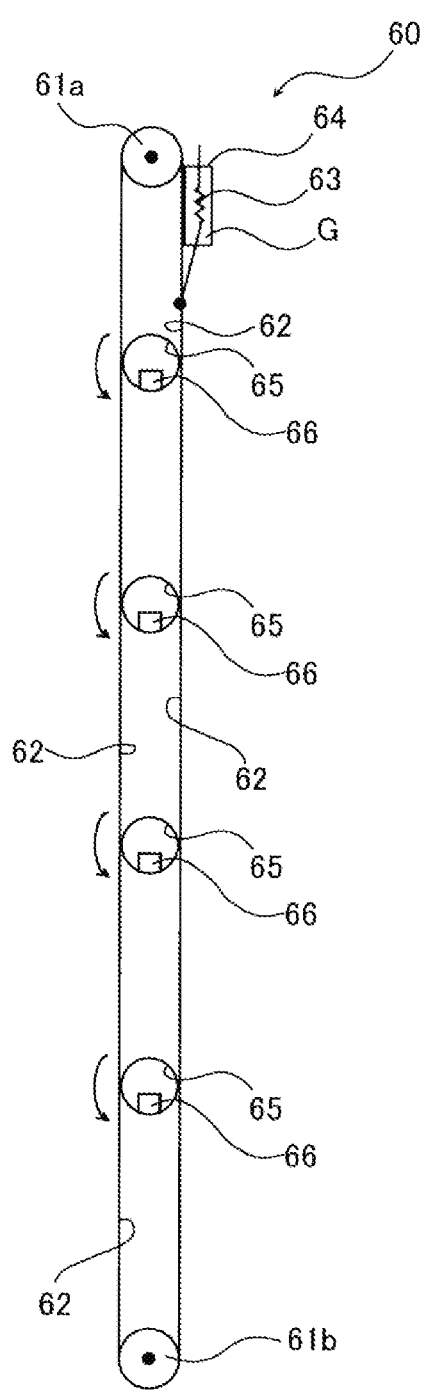

FIGS. 13A and 13B are configuration diagrams illustrating a latent heat storage body according to the twelfth embodiment, in which FIG. 13A is an overall configuration diagram and FIG. 13B is a partial configuration diagram. As illustrated in FIG. 13A, in the latent heat storage body 5 according to the twelfth embodiment, the component material CM is encapsulated in a plurality of containers C. The component material CM is configured with a latent heat storage material and a freezing point depressant. The freezing point depressant lowers the phase change temperature as the molar concentration increases, and has a component that has magnetism and is dispersed, like the depressant illustrated in the ninth and tenth embodiments. The container C and the component material CM are configured of a transparent material.

Further, the latent heat storage body 5 includes two plate members 40 which are a first plate member 40a and a second plate member 40b, a peripheral end member 50, and a temperature-sensitive mechanism 60 (see FIG. 13B). The two sheets of the plate material 40 are transparent plate materials disposed almost in parallel with each other. For example, these plate materials 40 are configured of a glass material. The peripheral end member 50 is interposed between the two sheets of the plate material 40 at peripheral ends of the two sheets of the plate material 40. An internal space closed by the two sheets of the plate material 40 and the peripheral end member 50 is configured by providing the peripheral end member 50 at the peripheral ends of the two sheets of the plate material 40. A plurality of containers C are vertically arranged in such an internal space.

With the above configuration, the latent heat storage body 5 according to the twelfth embodiment may be used as a window. Note that, in the twelfth embodiment, although the latent heat storage body 5 applicable as a window (whether openable or closable) will be described as an example, the latent heat storage body 5 is not limited to being applied to a window, but may be an outer wall material which does not function as a window, or may be used for a ceiling, an underfloor, or the like. Hereinafter, it is assumed that first plate member 40a is an indoor side plate member and the second plate member 40b is an outdoor side plate member.

As illustrated in FIGS. 13A and 13B, the temperature-sensitive mechanism 60 includes an upper pulley 61a, a lower pulley 61b, a ladder cord (cord) 62, a shape memory alloy spring 63, a grease case 64, a heat transfer grease G, a magnet cylinder 65, and a magnet (magnetic material) 66.

The upper pulley 61a is a pulley member provided on the upper side of the latent heat storage body 5, and the lower pulley 61*b* is a pulley member provided on the lower side of the latent heat storage body 5. The ladder cord 62 is an endless string member wound around the upper pulley 61*a* and the lower pulley 61*b*.

The shape memory alloy spring 63 is a member that can expand and contract in accordance with ambient temperature (the temperature of the first plate member 40*a* that is one plate member). The shape memory alloy spring 63 has a lower end side connected to the ladder cord 62 and is housed in the grease case 64. In addition, the shape memory alloy spring 63 has an upper end side connected to another member such as the peripheral end member 50. The inside of the grease case 64 is filled with heat transfer grease G. The grease case 64 is provided in contact with one plate member 40*a*.

The magnet cylinder 65 is a cylinder in which the magnet 66 is attached to an inner wall. The magnet cylinder 65 is connected to the ladder cord 62 at both sides thereof (both the first plate member 40*a* side and the second plate member 40*h* side), and the magnet 66 is in a state of being connected to the ladder cord 62 via the magnet cylinder 65. In addition, the magnet cylinder 65 is disposed on the upper side in the container C as illustrated in FIG. 13A. Further, an upper part of the container C is in a gas phase. Therefore, when the latent heat storage material is in a liquid state, the lower half of the magnet cylinder 65 is immersed in the latent heat storage material and the upper half is not immersed in the latent heat storage material.

Figure 14A:
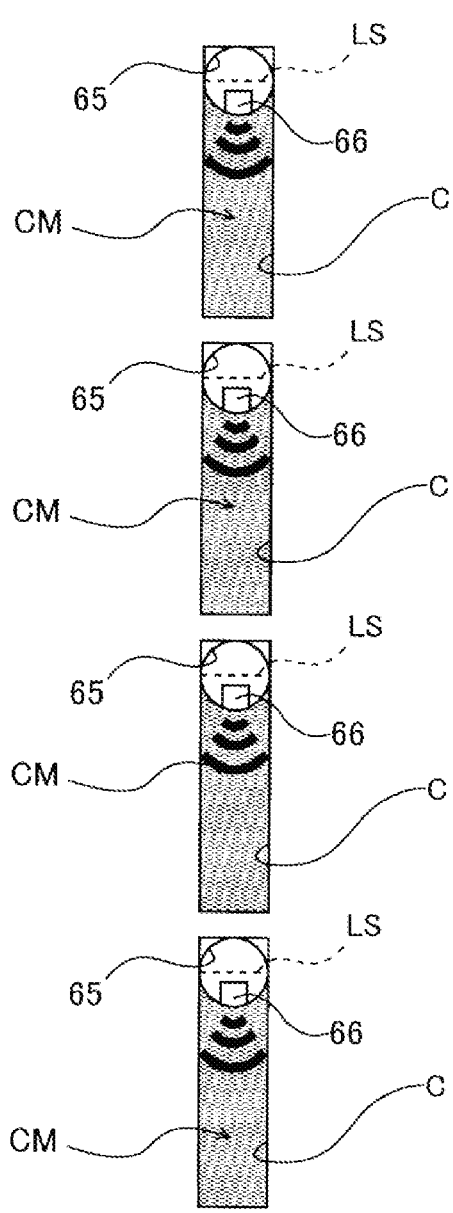
Figure 14B:
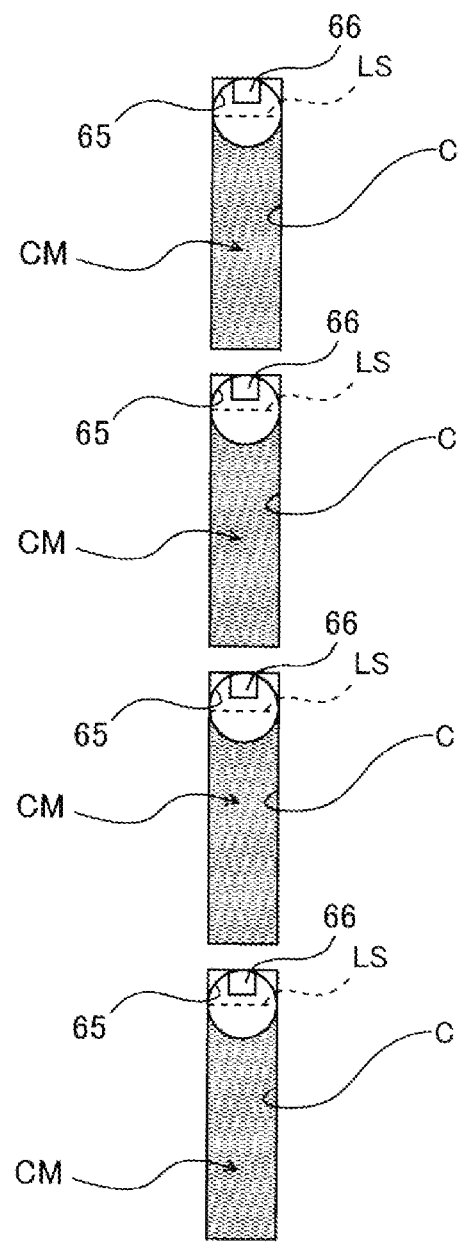

Next, the function of the latent heat storage body 5 according to the twelfth embodiment will be described with reference to FIGS. 13A, 13B, 144 and 1411 FIGS. 14A and 14B are state diagrams for illustrating the function of the latent heat storage body 5 according to the twelfth embodiments. FIG. 14A illustrates a state at a temperature lower than a specific temperature, and FIG. 14B illustrates a state at a temperature equal to or higher than the specific temperature. In the following description, an example will be described, in which the latent heat storage body 5 is provided under the floor, and is set to a high temperature setting when the ambient temperature is equal to or higher than a specific temperature and is set to a low temperature setting when the ambient temperature is lower than a specific temperature. Note that the present embodiment is not limited to the above, and by changing the position of the magnet 66 with respect to the magnet cylinder 65 reversely to the example illustrated in FIGS. 14A and 143, it is possible to set the latent heat storage body 5 to the low temperature setting when the ambient temperature is equal to or higher than the specific temperature and to the high temperature setting when the ambient temperature is lower than the specific temperature.

First, when the room temperature is lower than the specific temperature, the shape memory alloy spring 63 is in a relaxed state (expanded state). That is, as the low room temperature is transmitted to the shape memory alloy spring 63 via the first plate member 40*a*, the grease case 64, and the heat transfer grease G, the shape memory alloy spring 63 is in a relaxed state. When the shape memory alloy spring 63 is in the relaxed state, the magnet 66 of the magnet cylinder 65 is located under the liquid surface LS of the latent heat storage material, as illustrated in FIG. 14A, for example. In this case, the magnet 66 is close to the latent heat storage material, and its magnetic force acts on the dysprosium tetrachloride ion ($DyCl_4^-$) which is a component having magnetism in the latent heat storage material. Therefore, the dysprosium tetrachloride ion ($DyCl_4^-$) is in a state of being adsorbed to the magnet 66 side, and the concentration of the freezing point depressant in the latent heat storage material is lowered except for the vicinity of the magnet 66. As a result, the phase change temperature of the latent heat storage material may be increased to about 26° C., for example.

On the other hand, when the room temperature is equal to or higher than the specific temperature, the shape memory alloy spring 63 is in a tension state (contracted state). That is, as the high room temperature is transmitted to the shape memory alloy spring 63 via the first plate member 40*a*, the grease case 64, and the heat transfer grease G, the shape memory alloy spring 63 is in the tension state. When the shape memory alloy spring 63 is in the tension state, the shape memory alloy spring 63 pulls the ladder cord 62. As a result, for example, as illustrated in FIG. 14B, the magnet 66 of the magnet cylinder 65 is located above the liquid surface LS of the latent heat storage material. In this case, the magnet 66 is separated from the latent heat storage material, and its magnetic force is less likely to act on the dysprosium tetrachloride ion ($DyCl_4^-$) which is the component having magnetism in the latent heat storage material. Therefore, the dysprosium tetrachloride ion ($DyCl_4^-$) is in a state of being dispersed in the latent heat storage material without being unevenly distributed to the magnet 66 side. Accordingly, the freezing point depressant appropriately functions in the latent heat storage material, and the phase change temperature of the latent heat storage material may be lowered to about 18° C., for example.

As described above, according to the latent heat storage body 5 according to the twelfth embodiment, like the first embodiment, it is not necessary to provide the latent heat storage material for low temperature use and the latent heat storage material for high temperature use, and it is possible to self-adjust a phase change temperature. In addition, it is possible to set the phase change temperature to the low temperature setting using cool air during summer nights, etc. to make the latent heat storage material for low temperature use, and set the phase change temperature to the high temperature setting with heat from nighttime power in winter, etc., to make the latent heat storage material for high temperature use. Further, for example, it is possible to set the latent heat storage material for high temperature use when the ambient temperature is lower than a specific temperature in winter, and set the latent heat storage material for low temperature use when the ambient temperature is equal to or higher than the specific temperature in summer. Further, the latent heat storage body 5 has the magnet 66 and transitions between a state in which a component having magnetism is adsorbed, and a state in which the component is not adsorbed but dispersed in the latent heat storage material. Therefore, the phase change temperature may be changed for adsorption and for dispersion, by changing the concentration of the freezing point depressant in the region excluding the periphery of the magnet cylinder 65.

Furthermore, according to the twelfth embodiment, the latent heat storage body 5 has the shape memory alloy spring 63 that is in a relaxed state at the temperature lower than the specific temperature and is in a tension state at the temperature equal to or higher than the specific temperature, and depending on whether or not the temperature is equal to or higher than the specific temperature, causes, with the ladder cord 62, the magnet 66 to operate in a state of being close to or separated away from the latent heat storage material in the container C. Therefore, when the magnet 66 is brought close to the latent heat storage material in the container C, the component having magnetism in the freezing point depressant is adsorbed to the magnet 66, while, when it is separated away from the latent heat storage material, the component having magnetism of the freezing point depressant is dispersed in the latent heat storage material without being adsorbed by the magnet 66. As a result, the freezing point depressant is unevenly distributed in the latent heat storage material, and the phase change temperature may be changed.

As described above, while the present invention is described based upon the embodiments, the present invention is not limited to the embodiments described above, and modifications may be made within a range not departing from the spirit of the present invention, and technologies of different embodiments may be suitably combined within a possible range. Further, publicly known or well-known technologies may be combined within a possible range.

For example, in the above embodiment, although dysprosium tetrachloride ion ($DyCl_4^-$), which is a freezing point depressant, is described as an example of a component having magnetism, it is not limited to the freezing point depressant, and the component constituting the latent heat storage material may have magnetism if possible. The component having magnetism may be not only the component that generates latent heat and a melting point/freezing point adjuster, but also a dispersant and a nucleating agent, for example.

Further, in the various embodiments described above, the water in the component material CM may be the hydration water as a part of the latent heat storage material when the latent heat storage material is a hydrate, or the water existing separately from the latent heat storage material, and it does not matter whether or not it is a part of the latent heat storage material as long as it has the effects described in the above embodiments.

This application is based upon Japanese Patent Application (Application No. 2018-025784), filed on Feb. 16, 2018, the entire contents of which are incorporated herein by reference.

REFERENCE SIGNS LIST

1 to 5: latent heat storage body
10: temperature-sensitive mechanism (temperature-sensitive material)
11: first sleeve (sleeve)
11a, 11b: opening
12: second sleeve
13: connection piston (piston)
13a: first plate material
13b: second plate material
13c: connection rod
15: compression spring (spring)
16: shape memory alloy spring (temperature-sensitive member)
20: temperature-sensitive mechanism (temperature-sensitive material)
21: magnet (magnetic material, permanent magnet)
22: pedestal
23: shape memory alloy spring (temperature-sensitive member)
24: compression spring
25: case (partition wall)
30: temperature-sensitive mechanism (temperature-sensitive material)
31: magnet (magnetic material, permanent magnet)
32: temperature-sensitive soft magnetic body sleeve (temperature-sensitive soft magnetic body)
33: soft iron plate
34: hollow container
35: second temperature-sensitive soft magnetic body sleeve (temperature-sensitive soft magnetic body)
60: temperature-sensitive mechanism (temperature-sensitive material)
62: ladder cord (cord)
63: shape memory alloy spring
66: magnet (magnetic material)
C: container
CM: component material
S: membrane member

The invention claimed is:

1. A latent heat storage body, comprising:
a latent heat storage material;
a temperature-sensitive material exhibiting different functions at a temperature equal to or higher than a specific temperature and at a temperature lower than the specific temperature, and
a component material containing the latent heat storage material,
wherein a phase change temperature is changed by using the functions of the temperature-sensitive material according to ambient temperature,
the phase change temperature is set, by a function of the temperature-sensitive material when the ambient temperature is lower than the specific temperature, to one among a low temperature setting and a high temperature setting having a higher temperature than the low temperature setting, and the phase change temperature is set to the other one among the low temperature setting and the high temperature setting by a function of the temperature-sensitive material when the ambient temperature is equal to or higher than the specific temperature,
the temperature-sensitive material is contained in a same container as the latent heat storage material and exhibits a function according to a temperature of the latent heat storage material, and the phase change temperature is set to the low temperature setting when the temperature of the latent heat storage material is lower than the specific temperature, and the phase change temperature is set to the high temperature setting when the temperature of the latent heat storage material is equal to or higher than the specific temperature,
a specific component of the component material is adsorbed, separated, or unevenly distributed in concentration by the function of the temperature-sensitive material according to the temperature of the latent heat storage material, resulting in a change in phase change temperature,
the latent heat storage body comprising, in addition to the latent heat storage material and the temperature-sensitive material, water, and a freezing point depressant that is configured of a hydrated salt having a plurality of degrees of hydration having different orders and lowers the phase change temperature in accordance with an increase in an amount of moisture, and
the temperature-sensitive material is a polymer that exhibits hydrophilicity at a temperature equal to or higher than an upper critical solution temperature as the specific temperature and exhibits hydrophobicity at a temperature lower than the upper critical solution temperature.

* * * * *